(12) United States Patent
Rajasingham

(10) Patent No.: US 9,248,762 B2
(45) Date of Patent: Feb. 2, 2016

(54) VEHICLE OCCUPANT SUPPORT

(71) Applicant: Arjuna Indraeswaran Rajasingham, Bethesda, MD (US)

(72) Inventor: Arjuna Indraeswaran Rajasingham, Bethesda, MD (US)

(*) Notice: Subject to any disclaimer, the term of this patent is extended or adjusted under 35 U.S.C. 154(b) by 0 days.

(21) Appl. No.: 14/849,732

(22) Filed: Sep. 10, 2015

(65) Prior Publication Data

US 2015/0375642 A1  Dec. 31, 2015

Related U.S. Application Data

(63) Continuation-in-part of application No. 13/507,149, filed on Jun. 9, 2012, now Pat. No. 9,150,127, which is a continuation of application No. 11/639,088, filed on Dec. 14, 2006, now Pat. No. 8,251,444, which is a continuation-in-part of application No. 11/113,028, filed on Apr. 25, 2005, now Pat. No. 8,138,908, and a continuation-in-part of application No. 11/185,784, filed on Jul. 21, 2005, now Pat. No. 8,020,658, application No. 14/849,732, which is a continuation-in-part of application No. 13/138,183, filed as application No. PCT/US2010/000237 on Jan. 28, 2010, now Pat. No. 9,174,555, which is a continuation-in-part of application No. 11/639,088, filed on Dec. 14, 2006, now Pat. No. 8,251,444, and a continuation-in-part of application No. 11/185,784, filed on Jul. 21, 2005, now Pat. No. 8,020,658, application No. 14/849,732, which is a continuation-in-part of application No. 14/210,413, filed on Mar. 13, 2014, which is a continuation of application No. 12/735,146, filed as application No. PCT/US2009/000342 on Jan. 21, 2009, now Pat. No. 8,763,954, said application No. 11/113,028 is a (Continued)

(51) Int. Cl.
*B60N 2/28* (2006.01)
*B62B 7/06* (2006.01)

(52) U.S. Cl.
CPC ............ *B60N 2/2884* (2013.01); *B60N 2/2821* (2013.01); *B60N 2/2848* (2013.01); *B60N 2/2863* (2013.01); *B60N 2/2872* (2013.01); *B60N 2/2875* (2013.01); *B62B 7/06* (2013.01)

(58) Field of Classification Search
CPC ... B60N 2/2812; B60N 2/2821; B60N 2/2884
USPC ............... 297/216.11, 256.13, 256.16, 256.1, 297/314, 487, 488, 466, 464, 344.24
See application file for complete search history.

(56) References Cited

U.S. PATENT DOCUMENTS

| | | | |
|---|---|---|---|
| 3,357,736 A * | 12/1967 | McCarthy | B60N 2/071 296/68.1 |
| 5,462,333 A | 10/1995 | Beauvais | |
| 5,664,830 A | 9/1997 | Garcia | |
| 5,722,719 A | 3/1998 | Glomstad | |
| 6,634,708 B2 | 10/2003 | Gunther | |
| 7,159,923 B2 | 1/2007 | Rajasingham | |
| 7,175,221 B2 | 2/2007 | Rajasingham | |
| 7,219,958 B2 | 5/2007 | Yamasaki | |
| 7,780,230 B2 * | 8/2010 | Serber | B60N 2/0745 297/216.1 |
| 8,138,908 B2 | 3/2012 | Rajasingham | |
| 8,251,444 B2 | 8/2012 | Rajasingham | |

*Primary Examiner* — Sarah McPartlin

(57) ABSTRACT

An arrangement in a passenger vehicle, that provides a mechanism for reducing the peak inertial loading on the occupant including children during acceleration relative to the vehicle under impact.

20 Claims, 49 Drawing Sheets

Related U.S. Application Data continuation-in-part of application No. 10/109,674, filed on Apr. 1, 2002, now Pat. No. 7,159,923, said application No. 11/185,784 is a continuation-in-part of application No. 10/681,304, filed on Oct. 9, 2003, now Pat. No. 7,175,221, application No. 14/849,732, which is a continuation-in-part of application No. 14/461,395, filed on Aug. 16, 2014, which is a continuation of application No. 12/451,317, filed as application No. PCT/US2008/005810 on May 7, 2008, now Pat. No. 8,864,229.

(60) Provisional application No. 60/751,305, filed on Dec. 19, 2005, provisional application No. 60/848,804, filed on Sep. 29, 2006, provisional application No. 60/849,685, filed on Oct. 5, 2006, provisional application No. 61/206,205, filed on Jan. 28, 2009, provisional application No. 61/208,445, filed on Feb. 24, 2009, provisional application No. 61/211,191, filed on Mar. 27, 2009, provisional application No. 61/214,672, filed on Apr. 27, 2009, provisional application No. 61/215,559, filed on May 7, 2009, provisional application No. 61/270,808, filed on Jul. 14, 2009, provisional application No. 61/276,298, filed on Sep. 9, 2009, provisional application No. 61/006,074, filed on Dec. 17, 2007, provisional application No. 61/062,002, filed on Jan. 23, 2008, provisional application No. 61/066,372, filed on Feb. 20, 2008, provisional application No. 61/072,241, filed on Mar. 28, 2008, provisional application No. 61/072,495, filed on Mar. 31, 2008, provisional application No. 61/123,345, filed on Apr. 8, 2008, provisional application No. 61/188,175, filed on Aug. 7, 2008, provisional application No. 61/191,309, filed on Sep. 8, 2008, provisional application No. 61/198,541, filed on Nov. 6, 2008, provisional application No. 60/282,105, filed on Apr. 9, 2001, provisional application No. 60/286,629, filed on Apr. 26, 2001, provisional application No. 60/332,419, filed on Nov. 14, 2001, provisional application No. 60/338,466, filed on Dec. 3, 2001, provisional application No. 60/357,644, filed on Feb. 20, 2002, provisional application No. 60/362,450, filed on Mar. 8, 2002, provisional application No. 60/461,434, filed on Apr. 10, 2003, provisional application No. 61/006,074, filed on Dec. 17, 2007, provisional application No. 60/960,620, filed on Oct. 5, 2007, provisional application No. 60/960,067, filed on Sep. 13, 2007, provisional application No. 60/962,077, filed on Jul. 26, 2007, provisional application No. 60/928,040, filed on May 7, 2007.

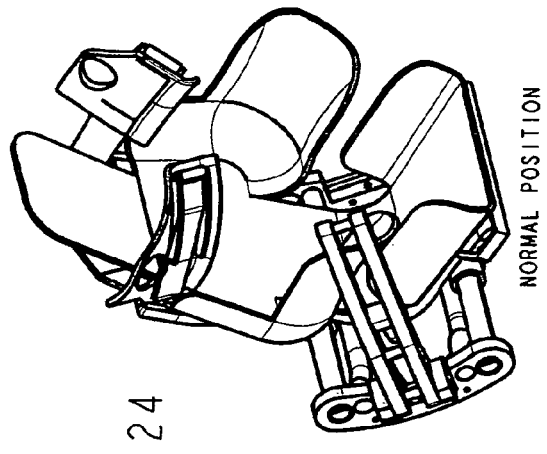
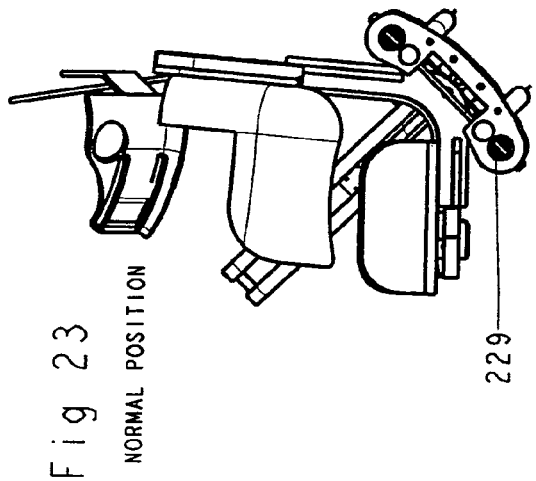
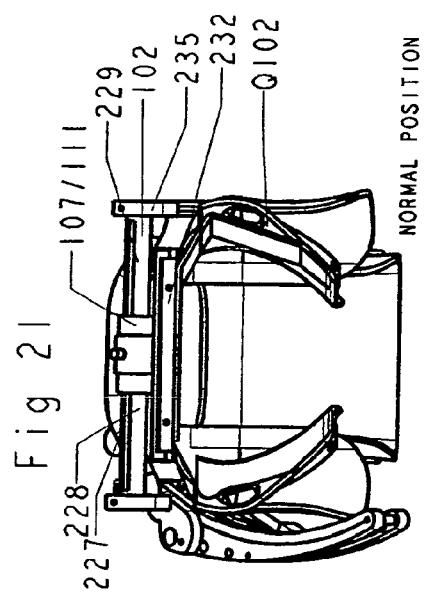
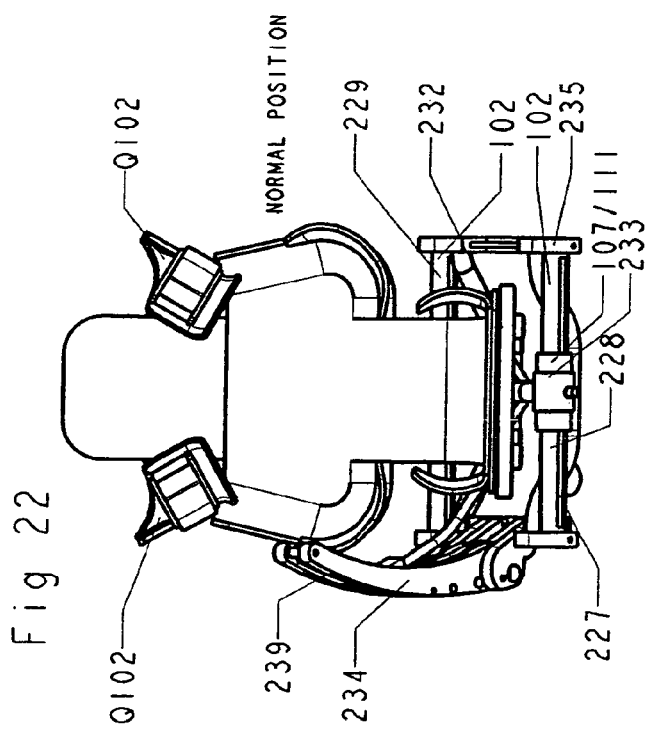

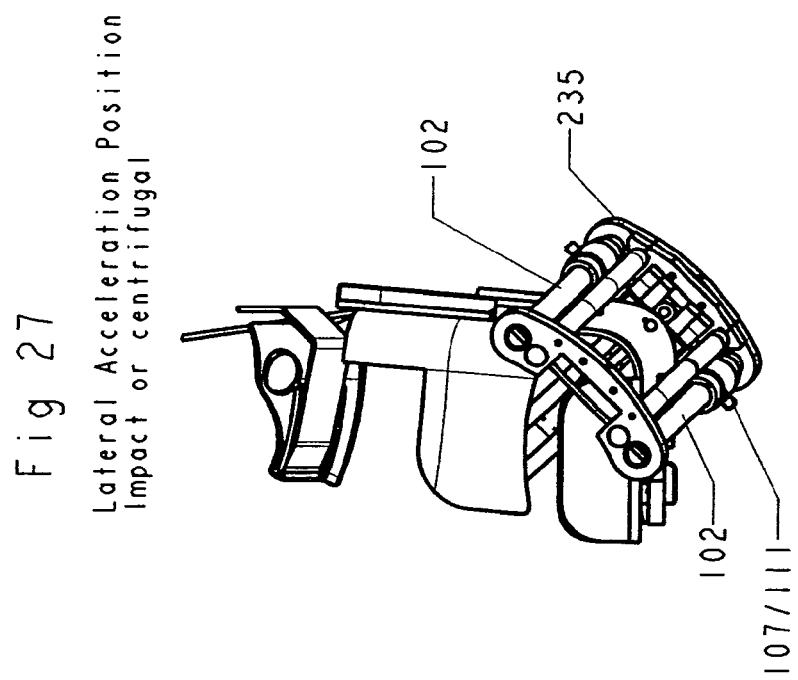
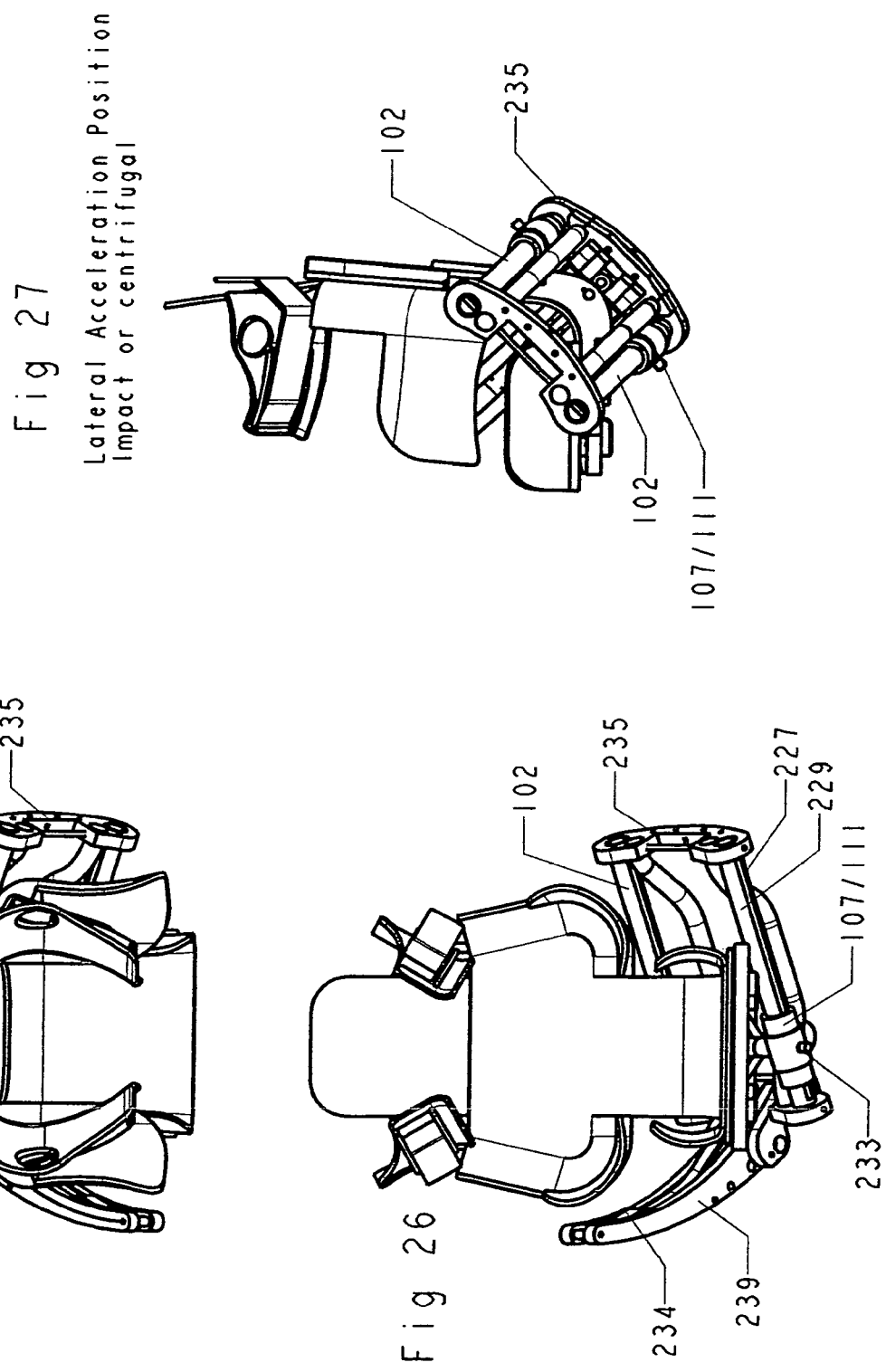
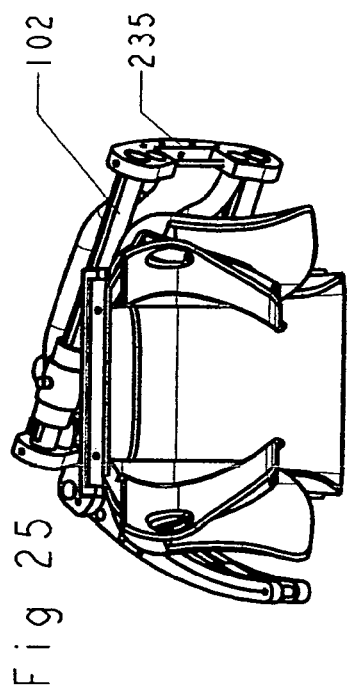

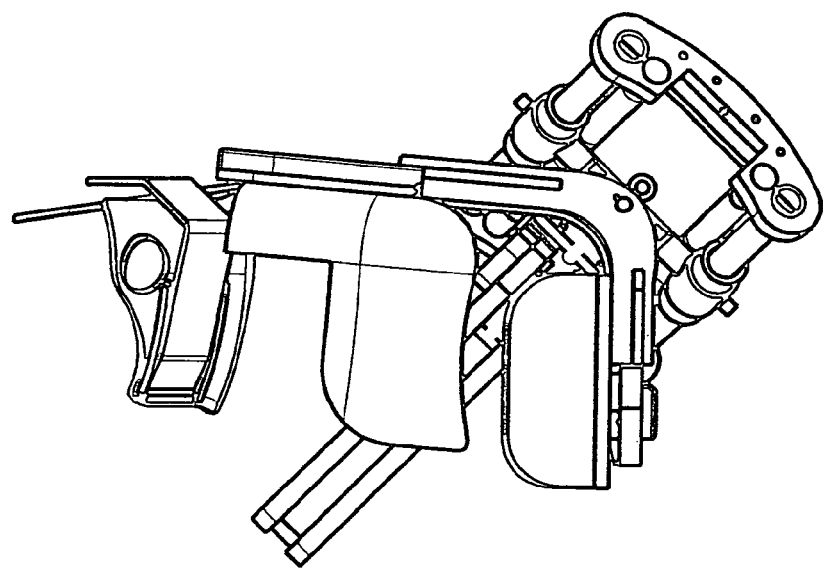
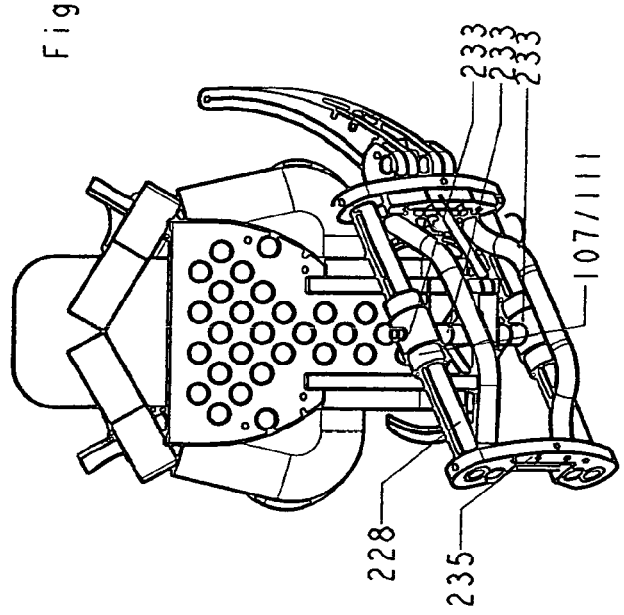
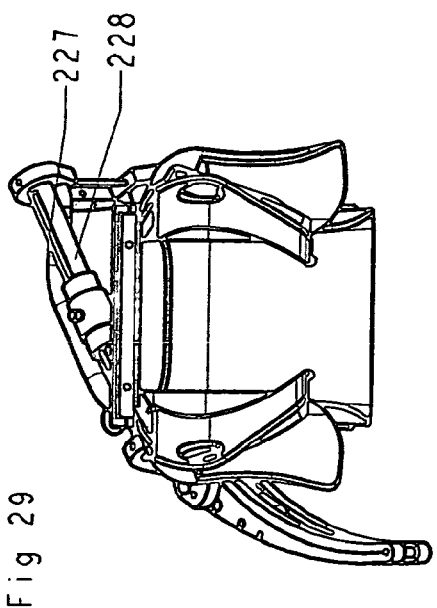

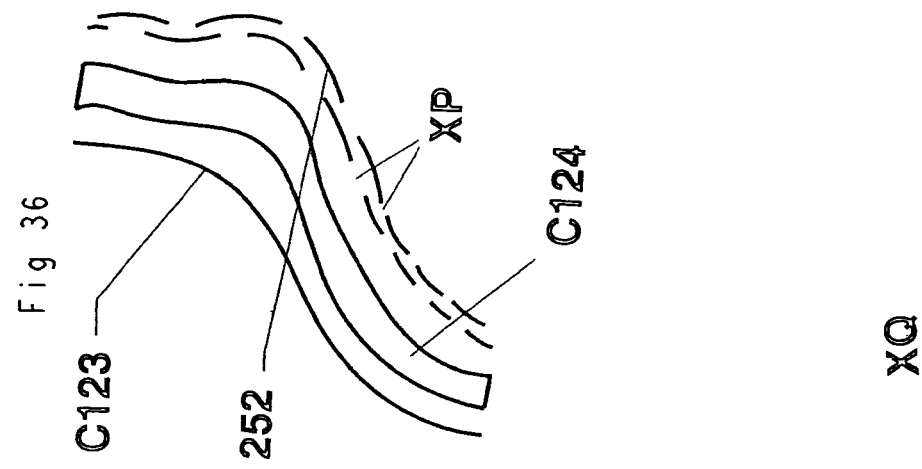
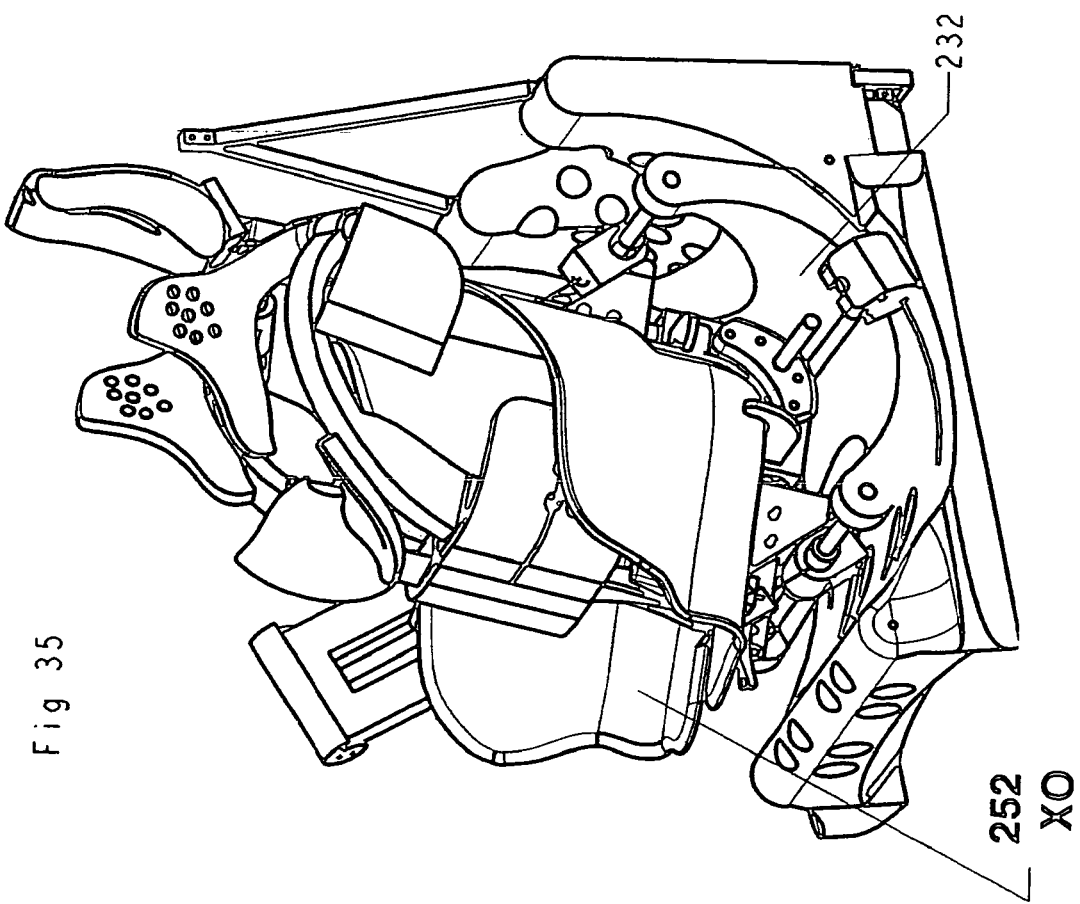

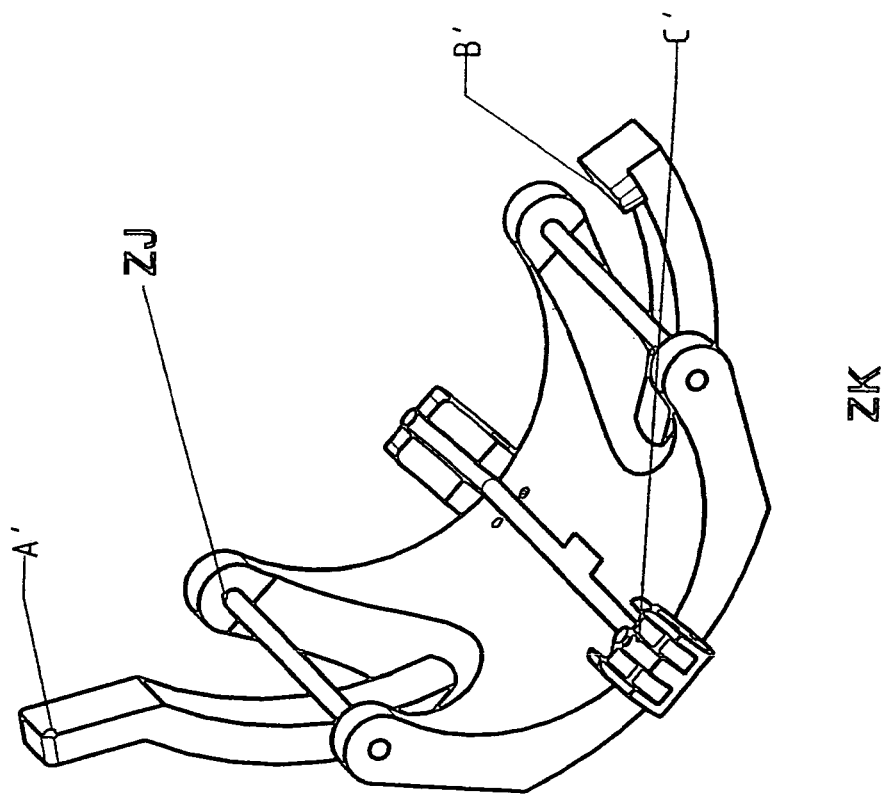

VEHICLE OCCUPANT SUPPORT

CROSS REFERENCE TO RELATED APPLICATIONS

Priority is claimed from each of the applications noted in the Application Data Sheet 37 CFR 1.76 filed herewith. The following applications are hereby incorporated herein by reference:
Ser. Nos. 13/507,149; 11/639,088; 60/751,305; 60/848,804; 60/849,685; 11/113,028; 11/185,784; 13/138,183; PCT/US2010/000237; Ser. Nos. 11/639,088; 11/185,784; 61/206,205; 61/208,445; 61/211,191; 61/214,672; 61/215,559; 61/270,808; 61/276,298; 14/210,413; 12/735,146; PCT/US2009/000342; 60/960,620; 61/006,074; 61/062,002; 61/066,372; 61/072,241; 61/062,495; 61/123,345; 61/188,175; 61/191,309; 61/198,541; Ser. Nos. 10/109,674; 60/280,470; 60/282,105; 60/286,629; 60/332,419; 60/338,466; 60/357,644; 60/362,450; 10/681,304; 60/461,434; 14/461,395; 12/451,317; PCT/US2008/005810; 60/928,040; 60/962,077; 60/960,067; 60/960,620; 61/006,074.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

Field of Invention

The present invention defines a means to incorporate in passenger vehicles, unique occupant supports that enhance the safety, comfort, utility and convenience. The special needs of child seats for vehicle have not evolved much beyond a static plastic seat with solid wings and projections to prevent excessive movement. This invention allows movement of the occupant to improve the well being of the occupant on the measures noted.

Objects & Advantages

Some of the objects and advantages of the present invention are safety arrangements particularly for lateral or side impacts that provide energy absorption and a reduction in the peak acceleration, intrusion into the space occupied by the passenger and reduce other factors that can seriously injure or kill passengers or occupants. The present invention also addresses the discomfort of lateral accelerations due to vehicle movement. This invention also addresses the special needs of children's support in vehicles to reduce injury, increase comfort, and improve convenience to the parent and finally the enhancing the experience and related child development that derives from stimuli absorbed while traveling in a vehicle.

BRIEF DESCRIPTION OF DRAWINGS

FIGS. 21-30 illustrate an alternative embodiment.

FIGS. 31-33, 35, 37-52 show versions of the preferred embodiment

In FIG. 31: XA—Slider Assembly can take many locked positions to allow rearward facing and forward facing positions as well as reclining positions for infants; XB—Loop connects tether support to latch for additional rigidity.

In FIG. 32: XC—TWO PART HARNESS These may be secured together by a loose piece of webbing that allows the two parts to seperate as the harness retracts over the head of the child. (The Harness is spring mounted to retract up and away from the occupant when released) allowing a single hand operation in a single motion to secure the harness or to release it XD—Latches for Harness and shell Separate bu can be locked together to release the shell at the same time as the harness. Particularly useful for the infant shell that may be removed with the child and carried or rolled along with a retractable handle and skate wheels).

In FIG. 33: XE—Shoulder pads are designed to be on the sides and in many embodiments in front of the shoulders, in the operating position; XF—Angled orientation of Pillow Pads 1. Provide support for sleep 2. Provide support during the front impact with the narrow front The front will be narrower with hinges noted. 3. In side impact are in positions to support the head as the seat swings or rotates; XG—Forward pivoting hinges (with limits) are limited to a small angular movement to prevent the forward impact load on the harness to pull it forward and reduce the gap between pillow pads to prevent the head from moving: forward; XI—Wide area of harness distributes the impact load. Harness may have—on child side or inner surface one or more air pouches or air cushions that distribute the load on impact across the harness; XJ—All surfaces next to the occupant may have suitable impact absorbing materials.

In FIG. 33A: XH—Central or a pair of hinges on arms that pivot forward (XH1) to reduce the gap between pillow pads (XH2) with force (XH3) from harness on impact.

FIGS. 34,36 show the detail for a passive air conditioning system that utilizes the kinetic energy of the mass of the occupant to force fresh air into the shell for comfort.

In FIG. 34: "Bellows" passive air conditioning for seat shell; XK—Shell has perforations; XL—Fabric or other surface material against child; XM—Flexible membrane has staggered perforations (even statistically staggered in mass produced items); XN—THE CYCLE—1. When body of child is forced towards shell the foam compresses and the membrane is pushed against the shell and BLOCKS airflow Therefore the air in the foam is "pumped" through the material "D" to the child. 2. When the force of the body is NOT against the foam/shell, the foam recovers while the membrane is sucked away from the shell and allows air through the holes in the shell to fill the foam.

In FIG. 35: XO—The shell is detachable with different sizes used for children of different sizes. The hips are supported well with a narrow bottom. The surface of the shell is near the lower body and is thin. Some embodiments have perforations for air circulation through the shell.

In FIG. 36: XP: Staggered openings are beneficial. XQ—"Bellows" action PASSIVE AIR CONDITIONING—The shell is designed to be close to the body. Openings on the shell are NOT lined up with the openings in the membrane. Therefore as the child moves in the shell, and the foam gets compressed, air is forced through the fabric as the membrane blocks as it is pushed to the shell. When the child moves away, the foam relaxes and the membrane is sucked in and opens the apertures on the shell bringing in new air.

In FIG. 37: XR—Crash Bar provides crush reduction of the occupant space and can swing away for access of the child; XS—Flex Bar provide s shock absorption function and has a pivot slide at one end and a pivot at the other end.

In FIG. 38: XT—The Pillow Pad supports the head. The Pillow Pad and its supports may be designed to flex to provide impact absorption; XU—During lateral acceleration or lateral impact, the Shell swings to increase the surface area of contact to support the occupant; XV—Slider at end of travel during impact.

In FIG. 39: XW—Pivoted sliders engage lateral slides; XX—Flex Bar filters impact force; XY—Dual latches that first release the harness and with more displacement release the shell. These separate latches may be ganged together with a catch. This is particularly useful in the Infant Shell where the shell is removed with the child most of the time; XZ—Shock absorbing device attached to sub-base. The Shock absorption device may have two or more sections in series. The first (spring damper) is tuned to acceleration of the shell and the cradle with the child during normal centrifugal acceleration due to vehicle turns. The second section may be tuned to impact conditions of extreme acceleration. The First section will therefore be fully compressed, (or expanded) before the impact section begins to operate and therefore will have positioned the child ahead of the impact to present an enhanced body surface area as a result of the prior rotation. This will improve over the time of impact.

In FIG. 40—Motion under lateral acceleration—In this embodiment the pivoting slider has 2 axes of pivoting and one of sliding on the side slide: YA—The Side Slide is slidably attached to a pivoted slider that attaches to the flex bar. This arrangement provides a reaction force on the cradle/shell/occupant on the opposite side of its center of gravity from the face of the shock absorber; YB—Flexbar, pivotally attached to the side slide inside the Crash Bar.

In FIG. 41—Motion under lateral acceleration: YC—Shock absorber (not shown) attached here and to the cradle.

In FIG. 42: YD—Ganged or separate latches for Shell/Harness.

FIG. 43: Shows each of the left half and right half harness having a belly pad (BP)/Aircushion (AC) that provides support to the torso of the occupant in a frontal or oblique impact.

In FIG. 44: YE—Pillow Pads may be adjusted with multiple settings as can Harness and Shoulder Pads; YF—Upper Assembly Hub holds Pillow Pads Harness and Shoulder Rests; YG—Upper Spine can adjust the height of Flex Spine and head support. To save weight the Upper spine can be connected direct to the Flex Spine; YH—Separate head Rest support telescopes inside and can be locked with a pin; YI—Adjustment possible with Pin or other arrangement; YJ—Flexible spine that can twist with a torsional load (A-I-T) or flex laterally with a side load as in a lateral impact (A-I-F). These loads can be from the inertial mass of the shoulders pushing against the shoulder support or the head against the pillow pads (these will reduce the peak acceleration of the head and/or thorax) Some embodiments may even have SEPERATE flexible spines to allow differential movement of the head and shoulders with this arrangement even alone; YK—Shell may have a cavity to support the flex bar to limit its distortion under load; YL—Flex Spine may flex laterally or twist to lower peak loads on head and thorax; YM—Flex Spine can hay different cross sections to either allow lateral flexing or rotation under torsion.

In FIG. 45: YN—Headrest may have separate support for height adjustment; YO—Wishbone brace attaches tether to base and to ISO-FIX latch; YP—Support for ISO_FIX latch attaches to Wishbone brace; YQ—Cradle Base can be locked to base in many positions mating cylindrical surface; YR—Metal Brace inside base.

In FIG. 46: YS—For Egress and ingress the Crash Bar is unlocked and swings out to allow the shell to tilt out or easy access. A single hand operation unlocks the Crash Bar; YT—Latch for harness not shown. Two loops on the left and right harness sections attach to a pair of hooks on the Shell support frame. A similar hook on the Shell support frame holds the Shell.

In FIG. 47: YU—For egress and ingress the pillow pads, harness and shoulder pads swing AWAY from the body of the child to provide easy access. The angled pivots allow engagement of these devices when needed with the child, but swing away when not needed.

In FIG. 48: YV—Upper Assembly support is anchored at bottom and attached to the headrest, pillow pads and shoulder pad at the top. During side impact force on the shoulders and/or head will twist the upper assembly support to filter out peak acceleration of the head and thorax.

In FIG. 49: YW—Position of pillow Pads show twist of Upper Assembly to protect the head and thorax. Axis A-I twists as shown by arrows A-I-T and relative position of shell to upper assembly.

In FIG. 50: YX—Position of Pillow Pads show the twist motion (A-I-T) of the Upper Assembly relative to the Shell and Cradle Lower Assembly during a side impact.

In FIG. 51: YY Flex Upper Assembly support protects head and thorax during side impact. Axis A-I deflects to A-I-F In FIG. 52: YZ—Flex Head with flex upper assembly support reduces peak accelerations of head and thorax on impact.

FIG. 53-57 show an alternative embodiment.

In FIG. 53: ZA—Flex Bars provide spring damper properties for support of the cradle assembly. The damper component of the flex bars may be provided by encasing/surrounding the spring material with a material that shatters or crushes or dents. (metals past yield point); ZB—The connection A and B may also be directly on the cradle assembly if the spring damper properties of the flex bar are not needed.

In FIG. 54: ZC—Flex-bars may be pivotally attached to the cradle; ZD—Shock absorbers may be attached to this extension of the flex bars and to the side of the sub base.

In FIG. 55: ZE—Connection means between A-A' and B-B' may have a shock absorber (spring damper/air damper) along its length. (there may be more/less than two such connection means.); Note—The positions of A,B must be such that both of the support forces on A, B from A', B' respectively act on the mass of the occupant/shell/cradle (OSC) on the opposite side of the Center of Gravity of the OSC to the shock absorber during impact or acceleration laterally. i.e. that the components of the forces through A,B in the direction of the acceleration pass through points on the plane passing through the center of gravity (CG) of the moving body (that includes the occupant and its support arrangement) Opposite the side of the component (in the direction of the acceleration) of the forces of the shock absorbers controlling the motion. The moment of the forces A,B about the CG should be greater than the moment of the shock absorber about the CG.

In FIG. 56: ZF—Sliders slide on the slides attached to the sub-base. These may have one or more degrees of rotational freedom relative to the Cradle that supports the Shell. If there is symmetric sliding to the two or more slides, two degrees of rotational freedom of the slide orthogonal to the sliding axis may be required; ZG—Wishbone connects tether to latch housing and base; ZH—Connection means between B'-B may be slidably connected at one end pivotally connected at the other end with one or more degrees of rotational freedom on each of the ends. The Flex Bar may also be pivotally connected to the Cradle of the Shell at BO; ZI—Connection means may be slidably connected at one end and pivotally connected with one or more degrees of freedom at the other end. OR pivotally connected at both ends A and A' with one or more degrees of freedom each. A may also be pivotally connected at its base A0.

In FIG. 57: ZJ—Slide bars for cradle Assembly. Two or more slides may be used for stability of the dynamic occupant support (child Shell); ZK—Sub-base Assembly (if used otherwise the base assembly) has one or more attachment points for flex bar(s) N, B', C', there may be direct attachment points with a connection means as in A'-A, B'-B or with an additional attached element as with C'.

LIST OF REFERENCE NUMBERS

Figure 1:
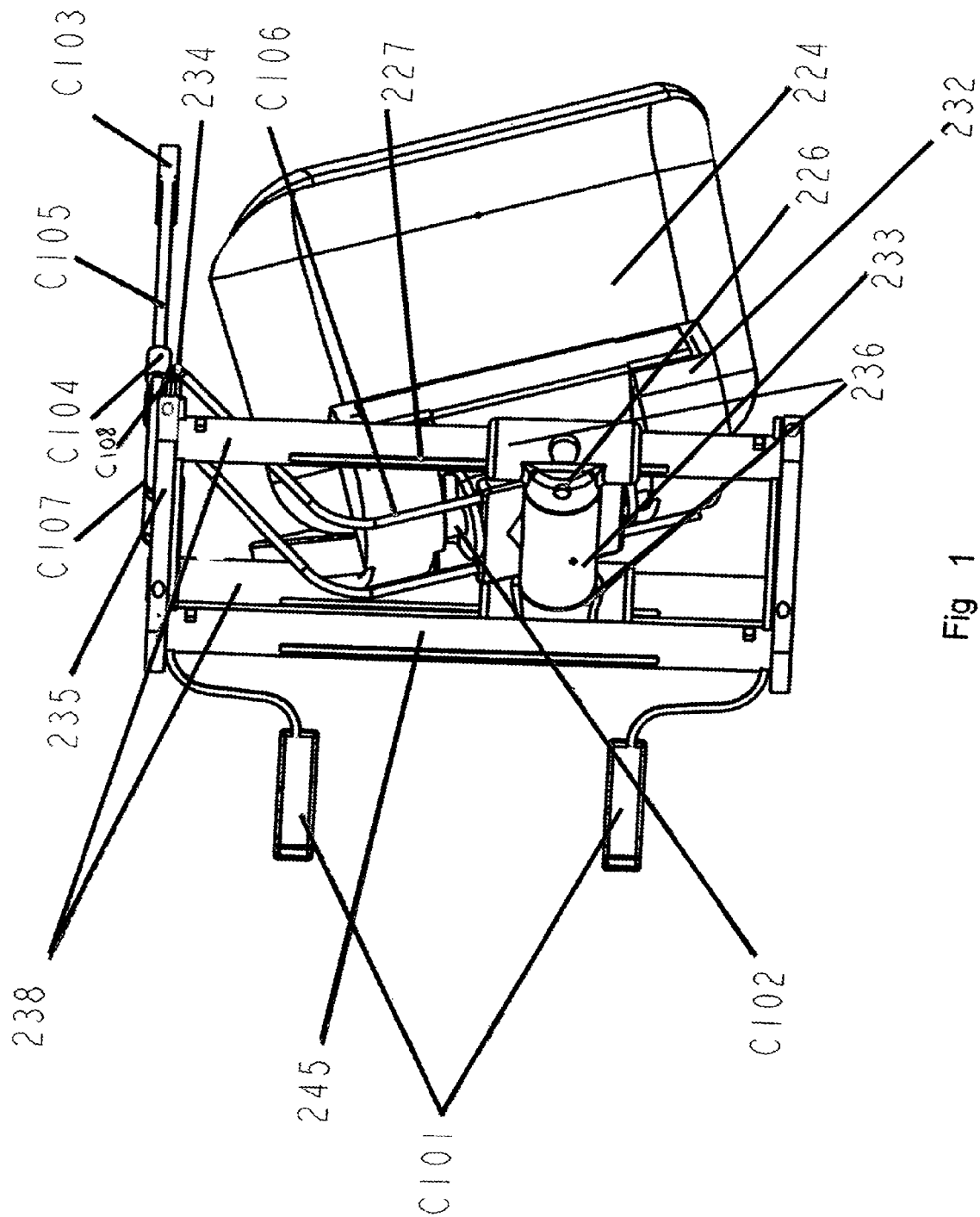
FIGS. 1 & 2 illustrates an embodiment of a (Child/Infant support mechanism) CISM and support. The mechanism for moving the CISM can be used for any passenger support mechanism. The illustrated position is during a lateral acceleration of the vehicle.

101—Central Member of Indo-skeletal structure
102—Safety Beam Lower Element
103—Side impact shock absorbers
104—External Air Bags
105—Perforation Shields
106—Protector Shields
107—Safety Beam Upper Element
108—Auxiliary Beam. (fixed or sliding)
109—Multi-element contoured passenger seat
110—Vehicle Shell/Body
111—Secondary Slides/Impact decouplers/pivoting slider
112—Locking devices
112A—Pivot for Protector shield
210—Child or Infant support mechanism (CISM)
211—CISM support pivots
212—Lock pin—Internal Airbag equivalents (IAE) with Safety beam lower element
213—Pin slot for lateral impact movement
214—Internal Airbag equivalent shock absorber
215—Slot for housing Internal Airbag Equivalent shock absorbers
216—Pin Hole for registering Lock Pin
217—Support Key—secondary slide to outer rotator
218—CISM Support Bracket
219—Pivotal support for CISM Support Bracket
220—Pivot for Internal Airbag equivalent attached to CISM support bracket
221—Fixed Support for safety beam lower elements and internal airbag equivalents
222—support for secondary slides, CISM support bracket and internal airbag equivalents
223—Support flange between Secondary slide and internal airbag equivalent active ends
224—Internal airbag equivalents—dual movable active end at center
225—Internal Airbag Equivalents—dual movable extremes-expansion/compression.
226—Lock pin hole on dual internal airbag equivalent center support
227—Top lock flanges
228—Side lock flanges
229—Front lock flanges
230—Side support flange
231—Lateral Brace
232 CISM Support Bracket/cradle
233—Pivotal support for CISM Support Bracket
234—Pivot for Slider or Shock absorber attached to one or both of CISM or its support bracket.
235—Fixed Support for safety beam lower elements and shock absorbers
236—Sliding pivot arrangement-supports secondary slides, CISM pivot bracket, shock absorbers
237—Support flange between Secondary slide and shock absorber active ends
238—Shock absorbers—dual movable active end at center
239—Slider or sliding Shock absorbers—dual movable extremes—expansion/compression.
240—Lock in hole on dual shock absorber center support
240A—Lock Pin support with slots to engage and compress one of the two shock absorbers
241—Top lock flanges
242—Side lock flanges
243—Front lock flanges
244—Side support flange
245—Lateral Brace
246—Side sliding surface
247—pivoted support for side sliding surface/crash bar
248—pillow pads
249—head rest
250 two part semi rigid harness with optional air cushion on inside surface
251—shoulder pads/supports
252—shell/torso support assembly
253—Flex bar 254A—Front pivot slider, 254B Rear Pivot slider
255—front spine
256—rear spine
257—anchor
258A rear support bar 258B Front support bar
259—shell latch
260—shell latch attach bar
261—torsion "T" bar
P101—Compressible Laterally Slidable (when detached) Hip Bolster
P102—Seat Bottom Contoured
P103—Impact Decoupler Secondary Slide Elements
P104—Retraction Slots for secondary slide support rails (rails not shown)
P105—Retraction slots for Secondary slides, retracted at Egress and Ingress
P106—Front side of rear seat
P107—Back of seat bottom
P108—Side bolsters in retracted position for egress and ingress
P109—Crushed side bolsters during impact (does not intrude into hip space)
P110—Side Bolster Air Bags
P111—Shoulder bolster/support—operating position and width
P112—Back rest
P113—Head Rest
P114—Head and Neck air bags (head rest is fixed to backrest so that it moves with back rest on lateral impact)
P115—Body Air Bags to hold and move the body on lateral impact. The airbags are shaped to push the arms out of the way at deployment time.
P116—Crushed shoulder bolster/support (controlled crush)
P117—Back Rest
Q101—Head rest support
Q102—Pivotally attached headrest flap (Left and Right)
P101—Compressible Laterally Slidable (when detached) Hip Bolster
P102—Seat Bottom Contoured
P103—Impact Decoupler Secondary Slide Elements
P104—Retraction Slots for secondary slide support rails (rails not shown)
P105—Retraction slots for Secondary slides, retracted at Egress and Ingress
P106—Front side of rear seat
P107—Back of seat bottom
P108—Side bolsters in retracted position for egress and ingress
P109—Crushed side bolsters during impact (does not intrude into hip space)
P110—Side Bolster Air Bags
P111—Shoulder bolster/support—operating position and width
P112—Back rest
P113—Head Rest
P114—Head and Neck air bags (head rest is fixed to backrest so that it moves with back rest on lateral impact)
P115—Body Air Bags to hold and move the body on lateral impact. The airbags are shaped to push the arms out of the way at deployment time.
P116—Crushed shoulder bolster/support (controlled crush)
P117—Back Rest
C101—ISOFIX latch
C102—CISM incline pivot
C103—Side Slide handle (with optional latch to release opening pivot)
C104—Side slider
C105—Side slide
C105—arm attached to the CISM support
C106—Pivot for Side slide
C107—Pivot on Side Slider for arm attached to the CISM support
C108—Worm Drive for seat slide to access position (the drive nut that engages Safety Beam Upper element 107 through slot in Safety beam Lower element 102, is not shown)
C110—Motor for Worm drive
C111—Flange to support Spring/damper for shock absorber elements (on each side of 111).
C112—Vertical pivots for rotation of seat frame under impact or for egress/ingress.
C113—Seat Frame support rear element
C114—Seat Frame support front side element
C115—Slide joints between Front and rear seat frame support elements
C116—Slot on 102 for drive nut on worm drive which drives 107 to and from the extended position.
C117—Seat slide for Fore/Aft control (seat not shown)
C118—Tether Support wishbone brace
C119—Slider Assembly
C120—Tether Support Loop
C121—Latches for Harness and Shell
C122—Forward Pivoting hinges with limits
C123—Fabric or other surface material against occupant
C124—Foam
C125—Flexible membrane
C126—Base
C127—wheels on detachable shell
C128—handle on detachable shell

DETAILED DESCRIPTION OF INVENTION

Preferred Embodiment

The preferred embodiment is illustrated in FIGS. 11-20, 31-57. This embodiment is for a CISM. It has a base that is rigidly mounted with a pair of ISOFIX latches and a tether. The rigidity of the base is enhanced with a "wishbone" that is made of a rigid material such as aerospace aluminum connected between the Isofix latches and the tether mount and secured to the base along its length. The wishbone is best with straight sections to allow it to accept tensile loads without distorting the surrounding plastic material. Further, considering that the mount for the base is on its rear with the ISOFIX latches and the tether, a lateral acceleration of the vehicle will apply an inertial loading from the child and its immediate support to twist the section of the base ahead of its mount. To counter that, the present invention, in addition to using rigid plastic materials has two lateral bars—one at the front of the base and the other at the back of the base and a rigid rod or tube that connects them from the front to the back . . . the toque applied to the front of the base from the inertial loading will be resisted by this rigid rod or tube.

The sub-base (see FIG. 31) has a crash bar that resists intrusion in to the occupant space, if forced in, it is adapted to push the occupant shell away from the intrusion. The crash bar has a side sliding surface 246 that is slidably connected to a pivoting head at the end of the flexbar 253 (FIG. 37) that is connected at its other end to the cradle 232. The sub base has two lateral slide bars 102 that have pivoting sliders 111 on them. These pivoting sliders are attached on their pivoting end to the cradle 258. There is a shock absorption device (not shown for clarity) that is both compression and expansion enabled as a spring damper connected to the sub base at the point 239B and the other end connected to the cradle 232 at 239A. Finally the crash bar 247 is pivotally attached to the sub base and with the release of a latch can be swung out thereby enabling the cradle to swing around with the shell thereby enabling easy egress and ingress.

Figure 18:
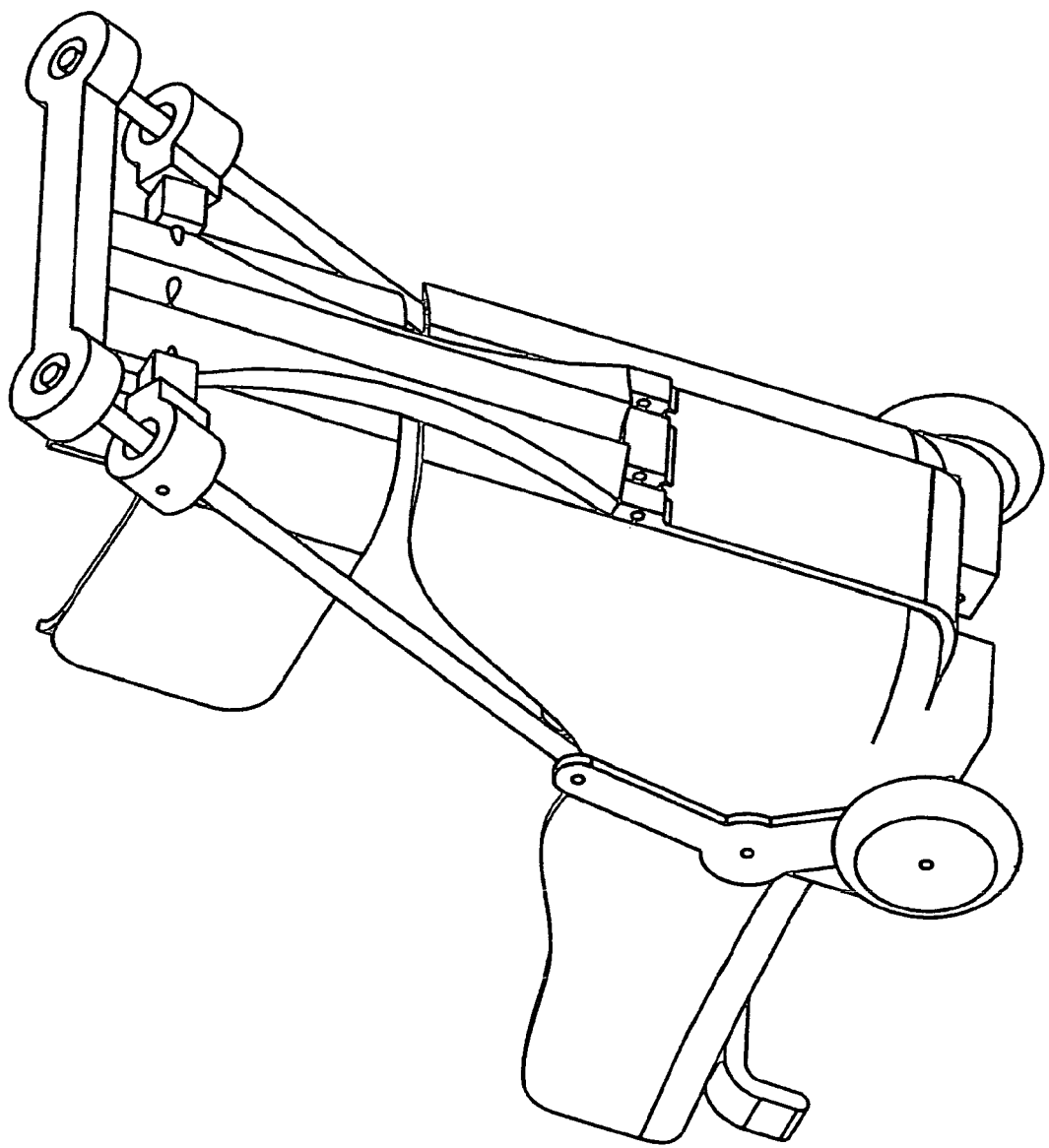
FIG. 18 shows the rear facing CISM shell removed from the cradle and with the undercarriage wheels C127 and handle extended C128 and ready for wheeling the child around.
Figure 19:
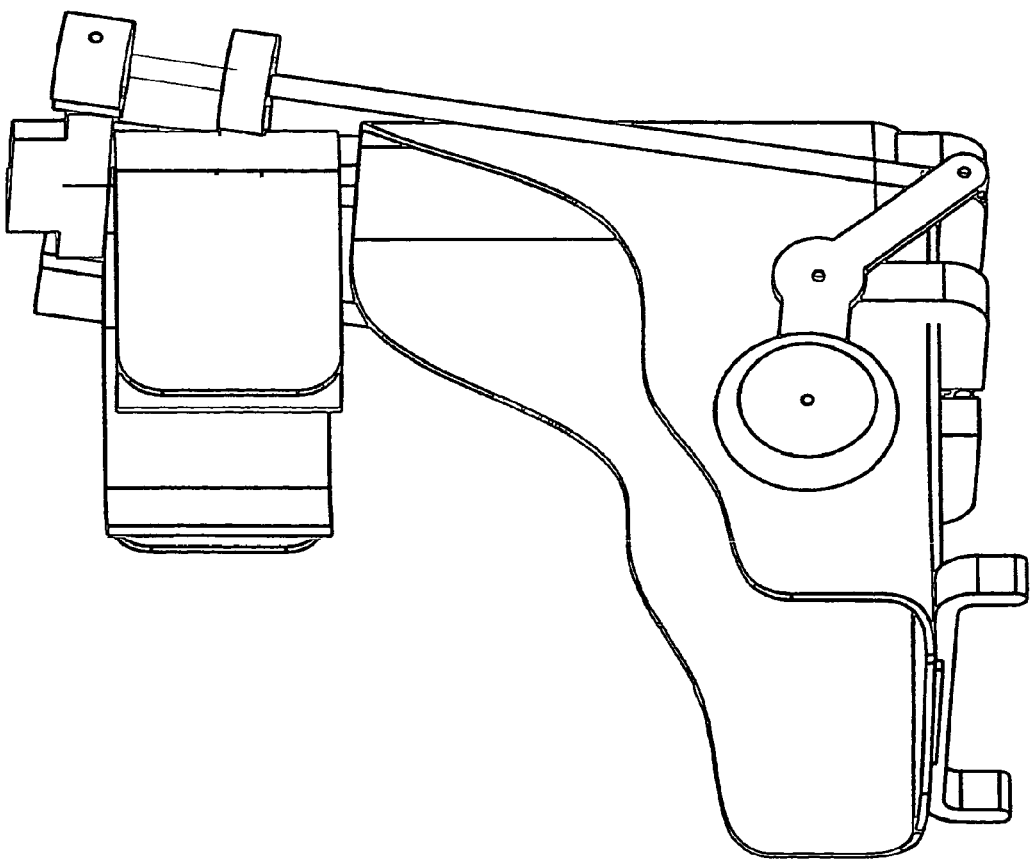
FIG. 19 shows the rear facing CISM shell with retracted wheels and handle.
Figure 20:
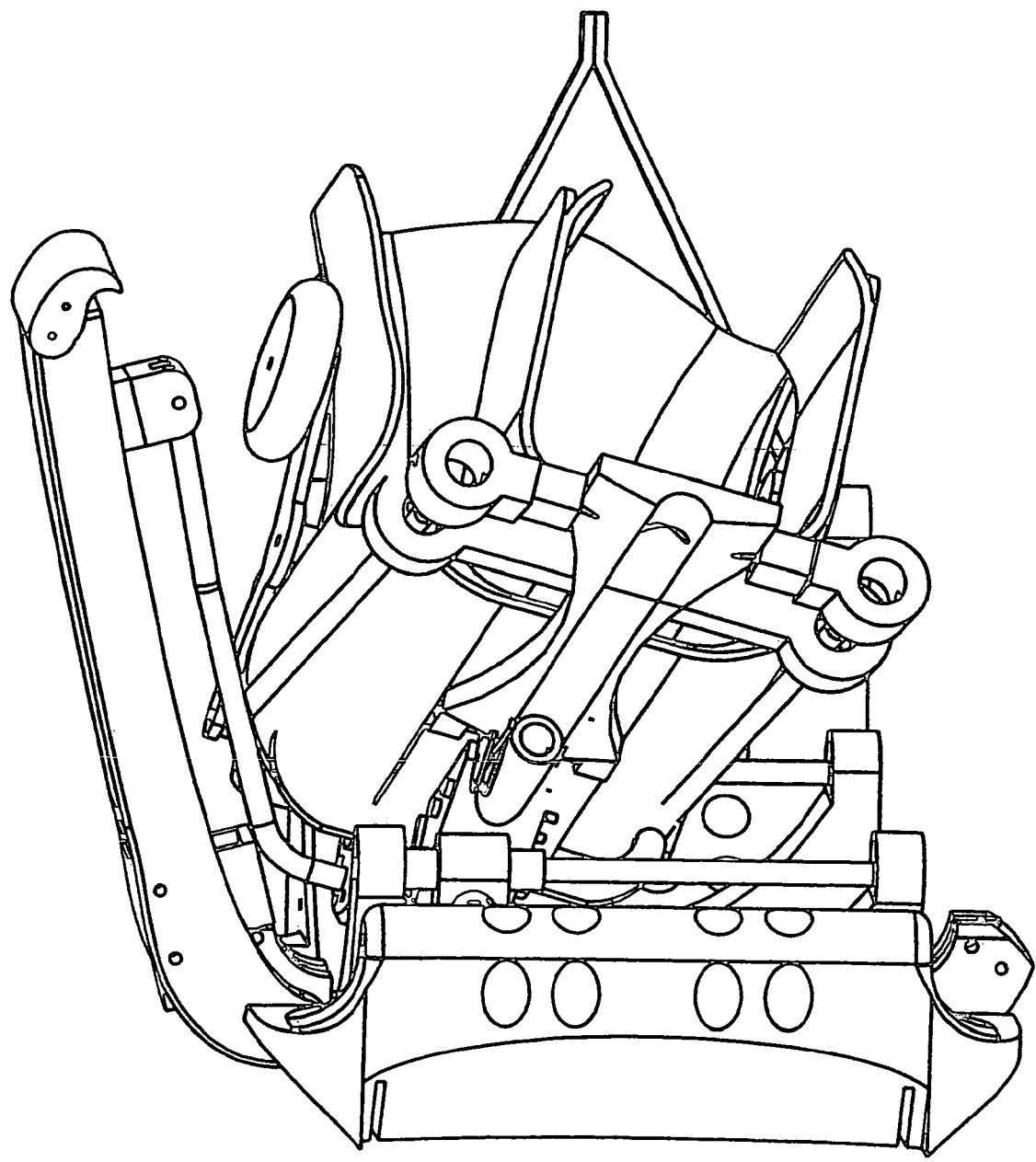
FIG. 20 shows the rear facing CISM under lateral acceleration.
Figure 31:
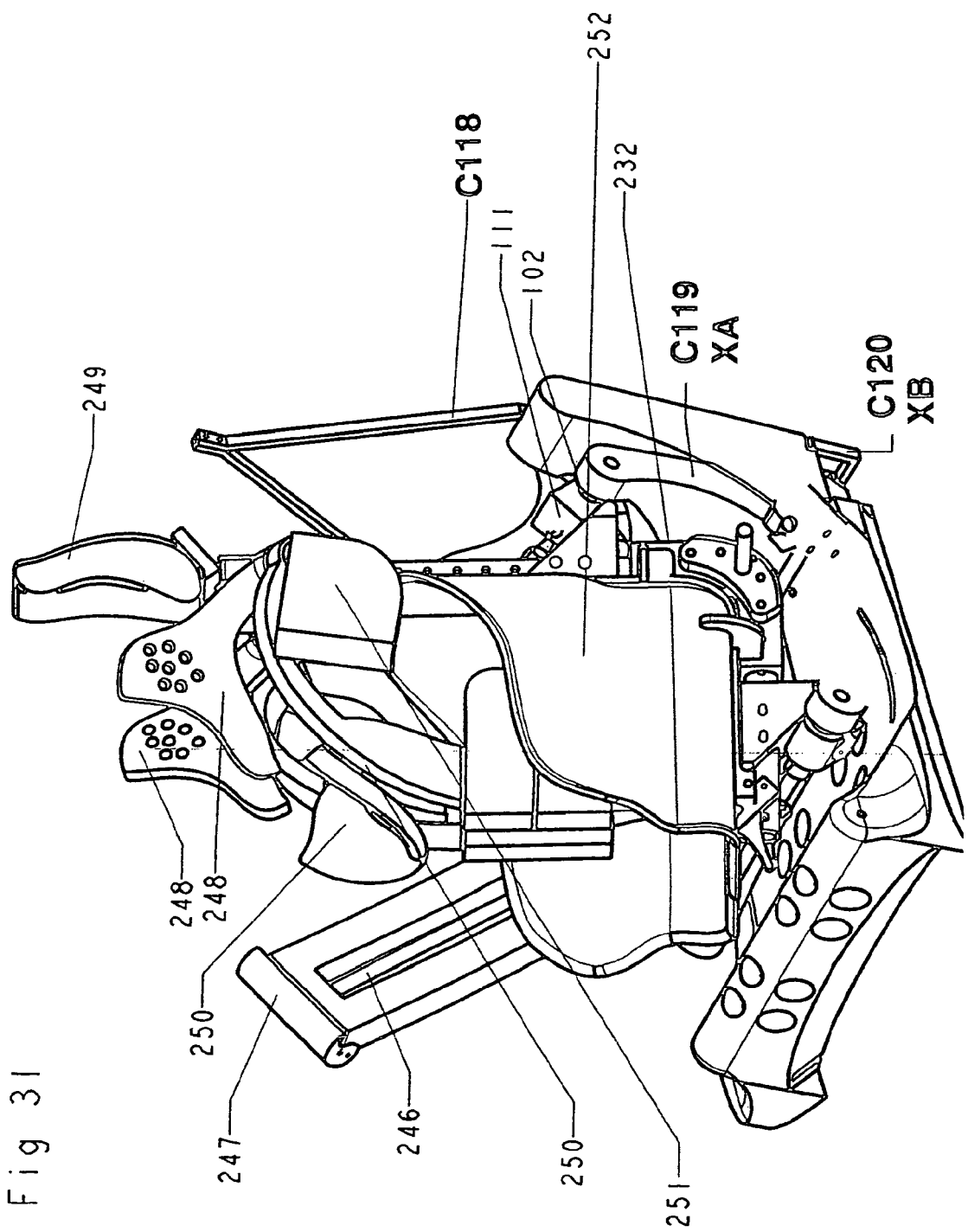
Figure 32:
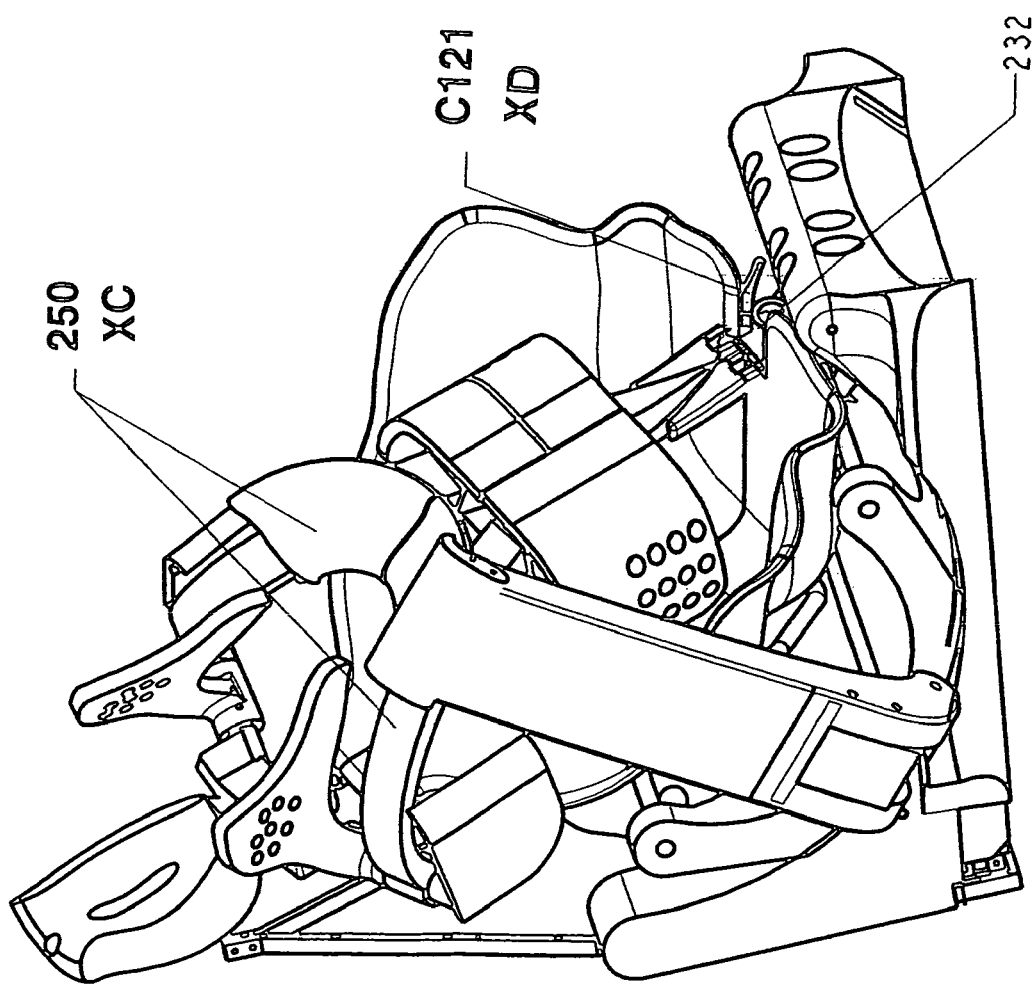
Figure 33:
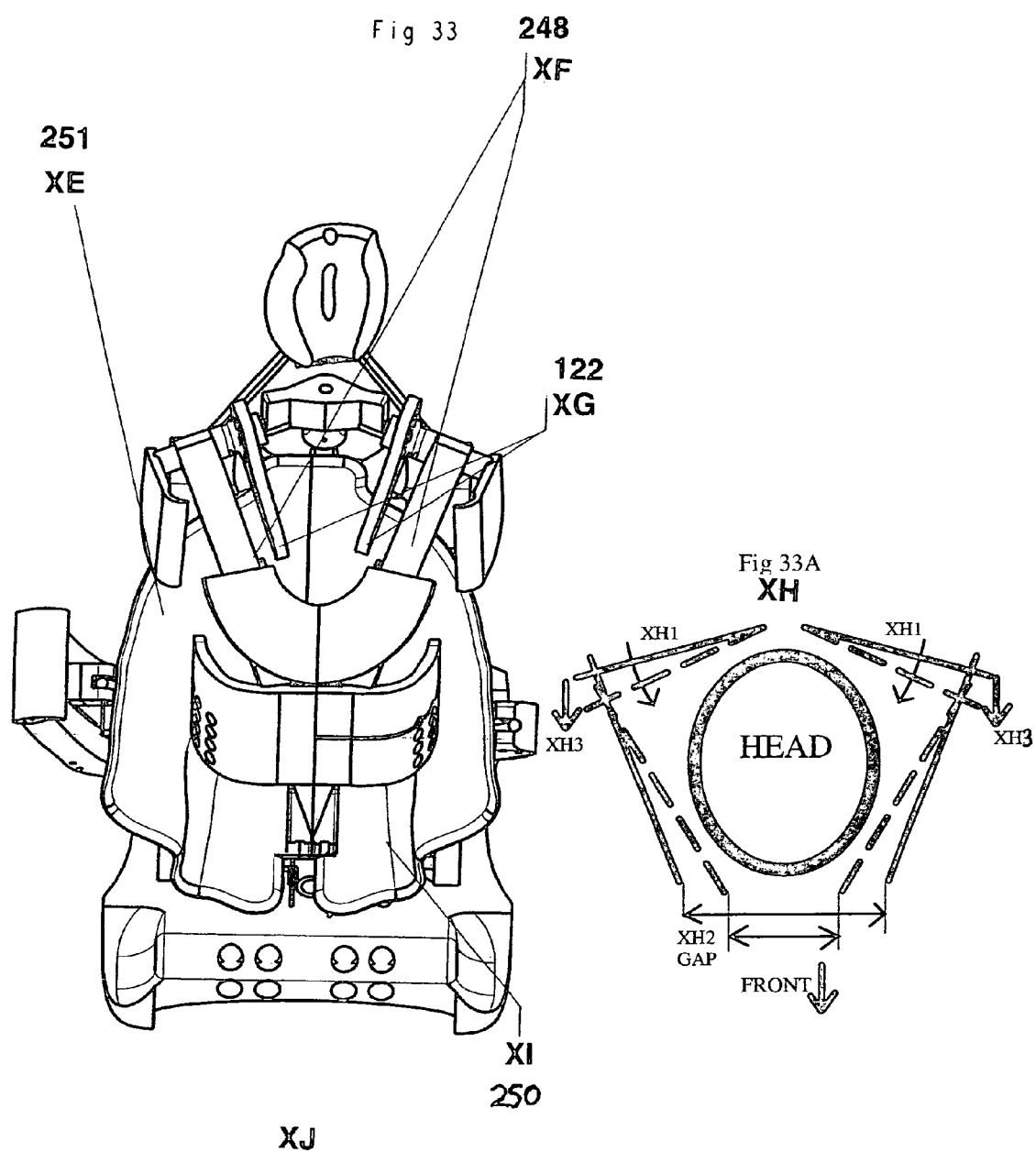

The Cradle 232 is supported by the two sliding pivots 254A and B, and the flex bar 253. The front facing shell 252 is locked onto it by engaging a ridge on the back of the shell with a support bar 258 A and with a pair of latches 259. Notably the rear facing shell is reversed with the ridge on leg section of the occupant and the latch under the torso section. FIG. 18 shows the (holes for) the attachment bar 260 for this latch in the rear facing shell.

The rear spine 256 has a support tube with pin holes on it so it can be raised and lowered by removing the pin, and has a torsion resistant rod attached at its bottom to the support tube. For the front facing seat, the head rest, and the assembly comprising the pillow pads, the harness and shoulder supports are attached to this. These items can be swung up on each of two axes, which are oriented to ensure that the harness and pillow pads swing away from the occupant when raised, thereby easing egress and ingress. The Harness and or the Pillow pad rising may be spring loaded to ease release.

The two part semi rigid harness is designed to be adjusted for length at a connection point just above the belly pad (that provides a broad area of contact to support the body) and is designed to have a latch arrangement at the end just below the shell on the cradle to hold it in position. This latch may be moved forward and backwards to ensure that the seat can be used for children of all shapes.

It may be seen that the pillow pads are inclined towards the front and slightly outwards laterally. This is to aid the use of the pillow pads as pillows for the rest of the child. When the shell and the occupant are under lateral acceleration, their inertial mass will force the shell and cradle to rotate and thereby orient the pillow pad in the direction opposite that of the acceleration to orient to the near vertical position (see FIG. 40), thereby supporting the head under severe acceleration. Notably the position of the pillow pads in the normal operating position will reduce obstruction to the field of view of the child and reduce the impairment to hearing when compared to other child seats with large wings.

The entire upper assembly containing the headrest, pillow pads, harness and shoulder pads/supports can be moved up and down by disengaging a pin on the rear spine and moving the support tube.

Figure 49:
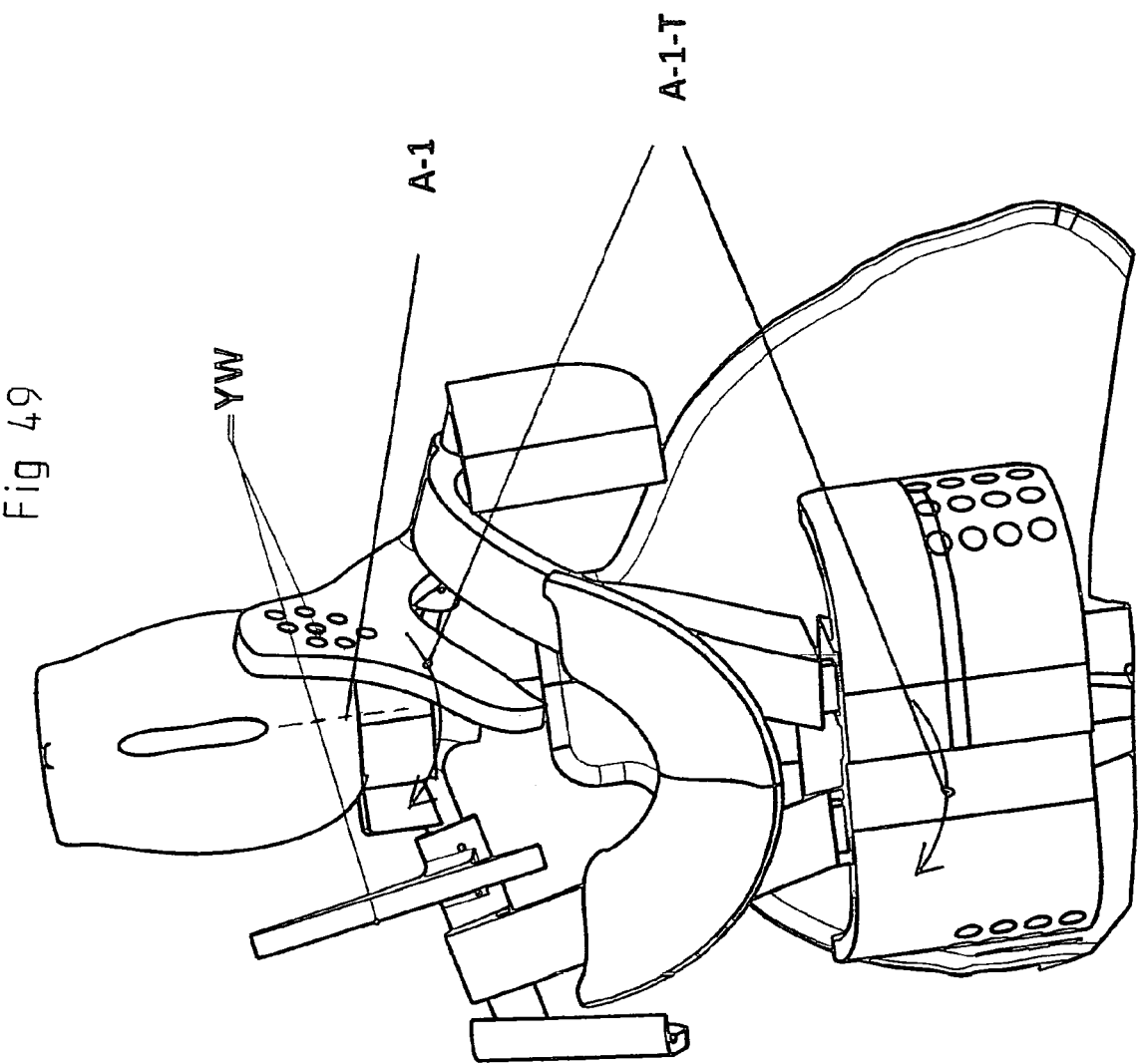
Figure 50:
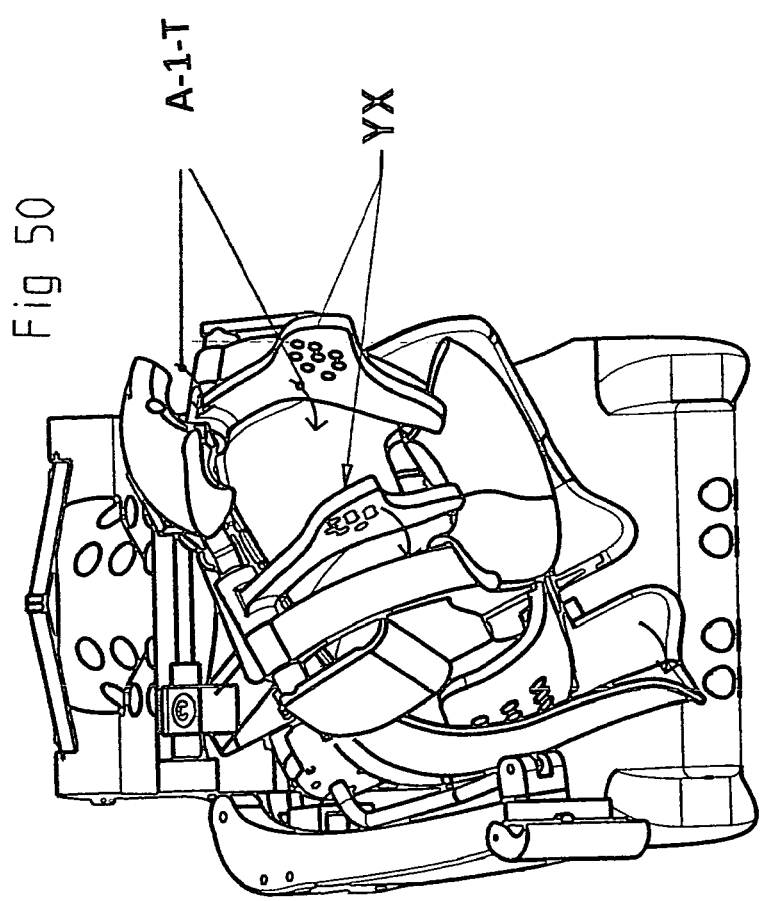
Figure 51:
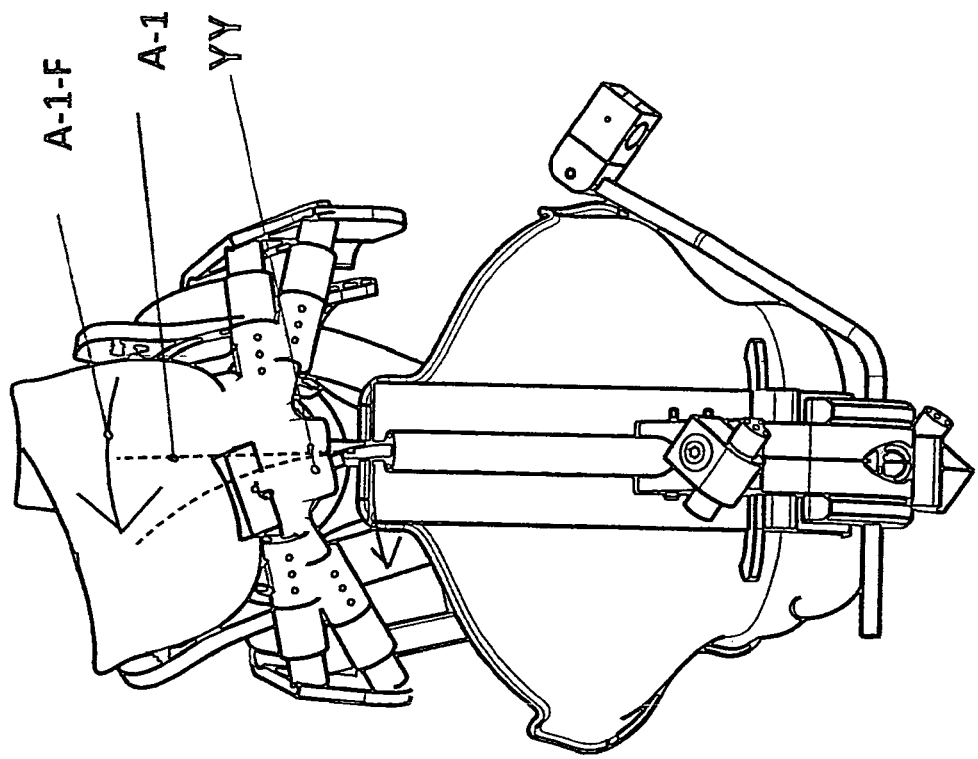
Figure 52:
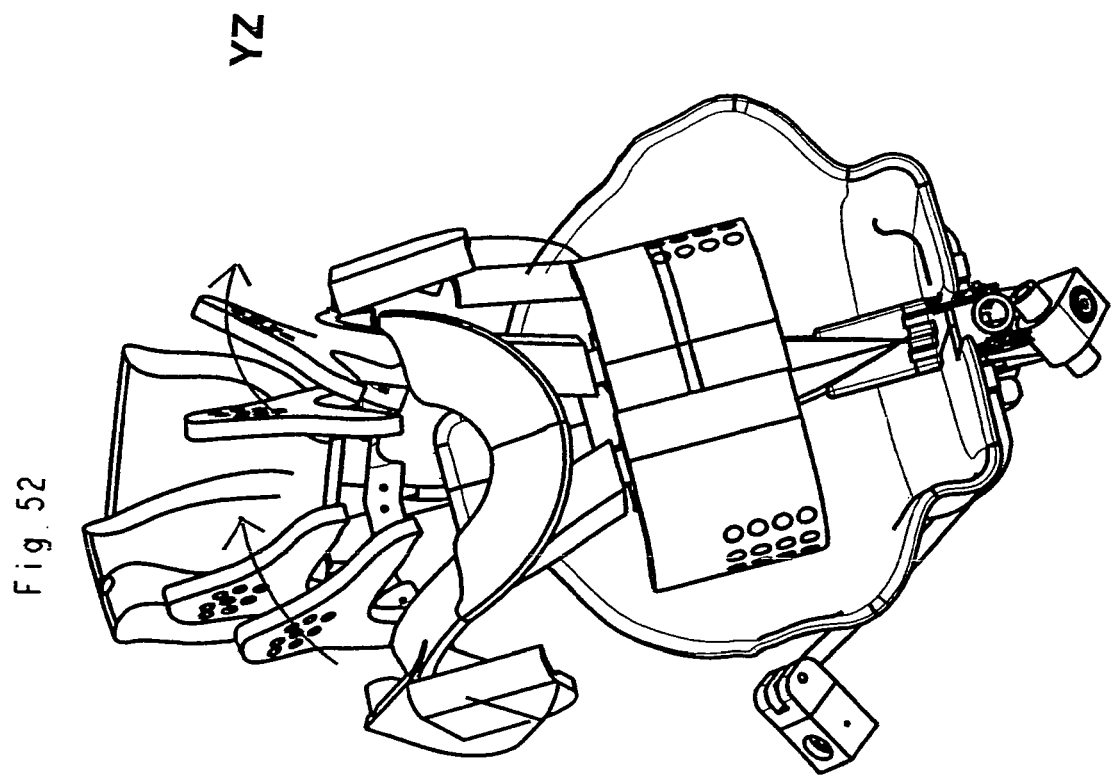
Figure 53:
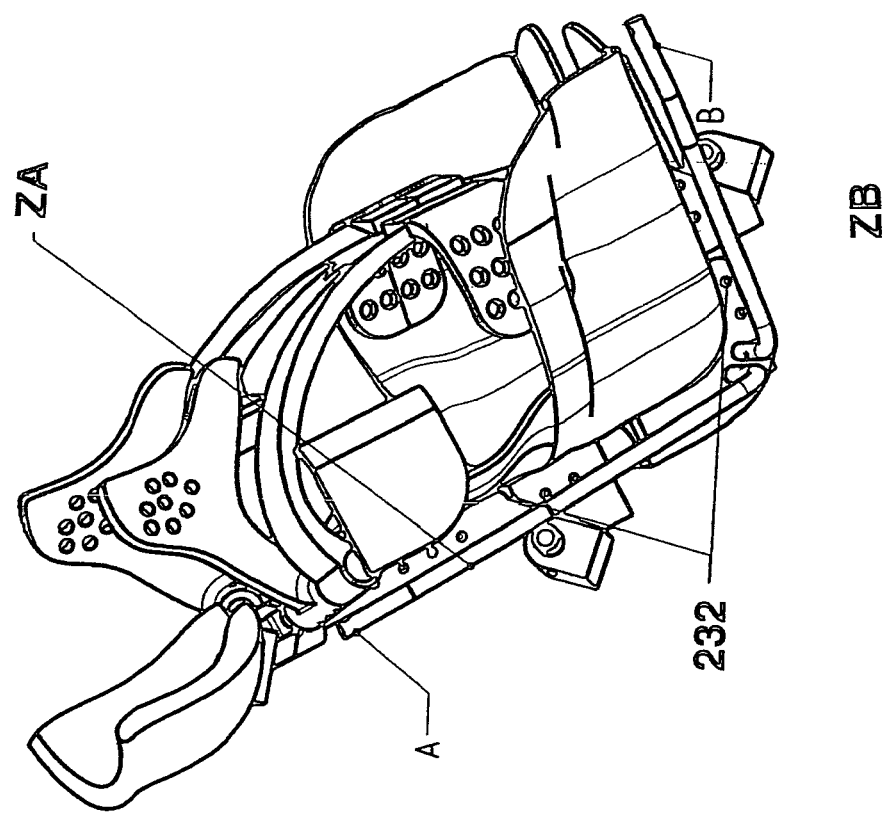
Figure 54:
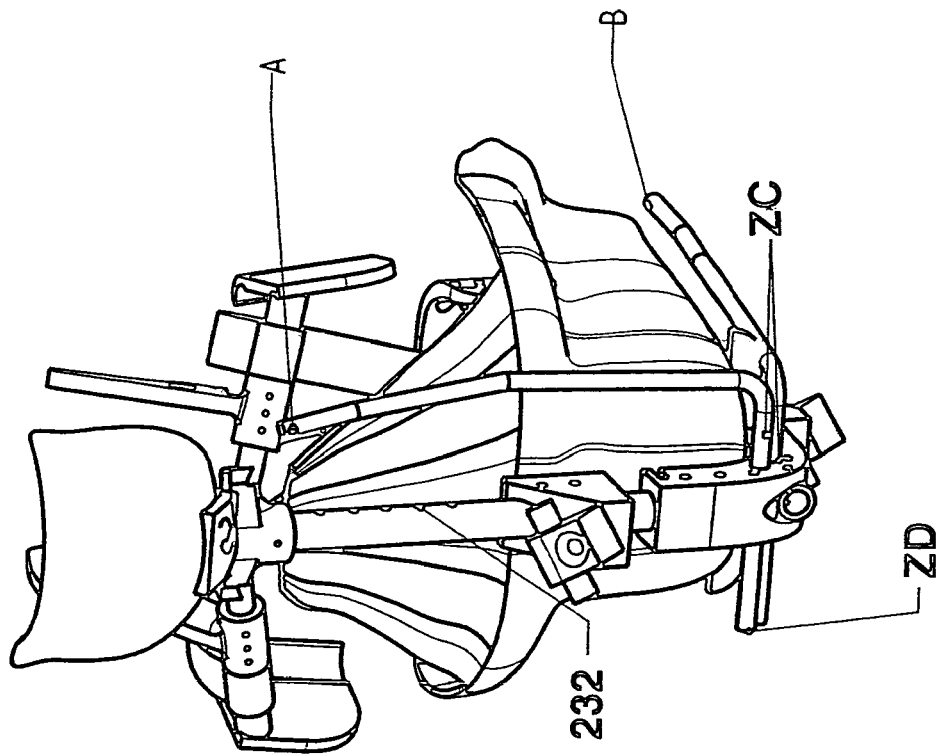
Figure 55:
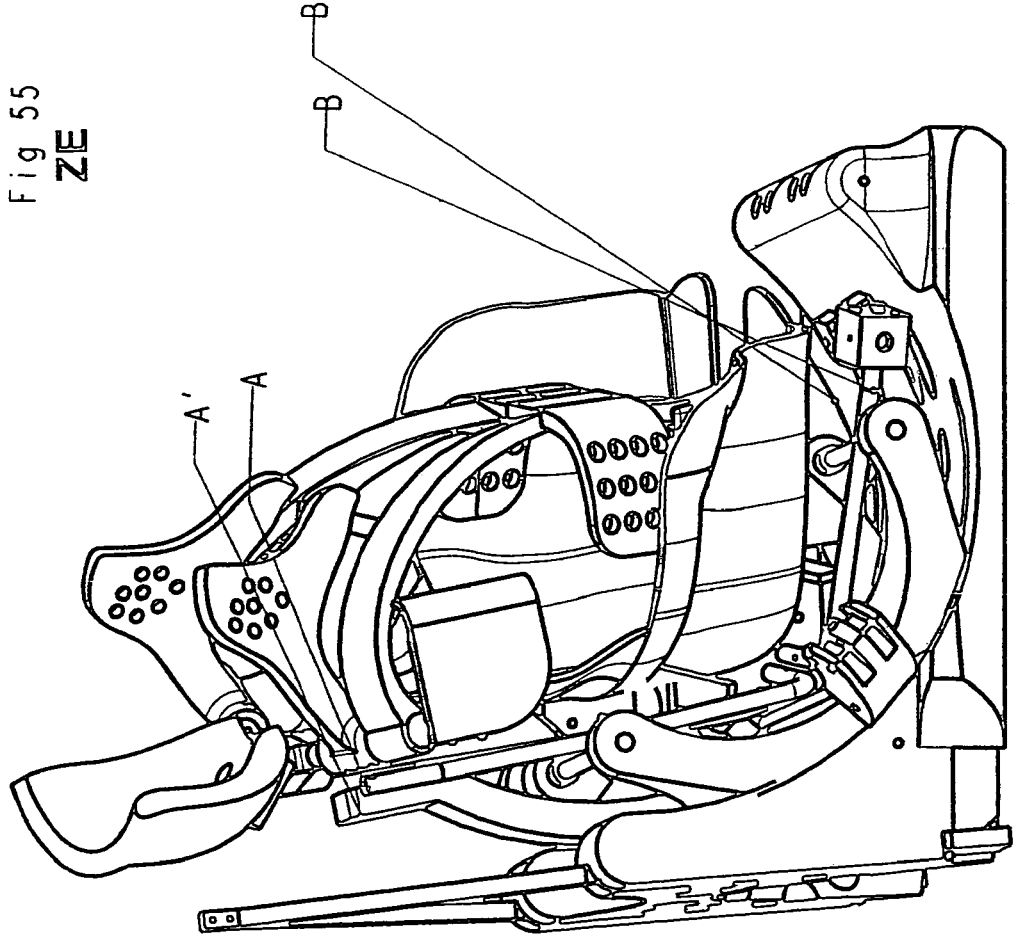
Figure 56:
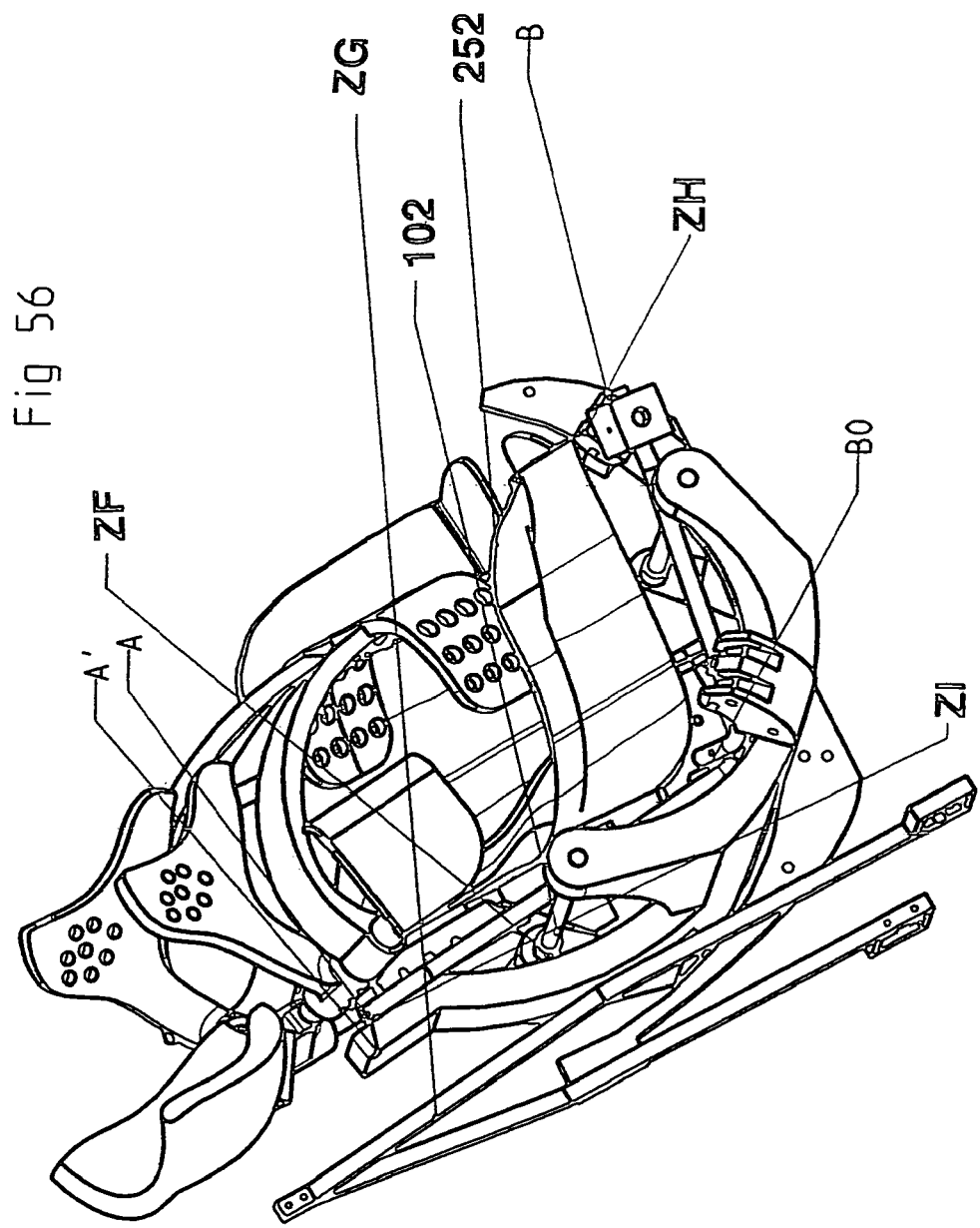

In addition the upper assembly support rod may be designed to twist along its axis so that the upper assembly, while resisting the inertial loading of the head and shoulders lags behind the movement of the shell thereby allowing the head to reduce peak accelerations. This is seen in FIGS. 49 and 50, another variation of the embodiment has a flex spine that bends to accommodate a differential motion desired between the head and the thorax. This is illustrated in FIGS. 51 and 52.

In addition the material for the Pillow pads may be designed to flex on contact with the head thereby reducing peak loading conditions.

Finally to address front impact, the pillow pads in the normal operating position constrict the space in front and below the face. In the front or certainly in an oblique impact these will support the head rather than allow the neck to take the entire loading resulting in high neck tensile load conditions. A variation of this design has a spring loaded pivot arrangement at the main Upper assembly hub. On contact of the torso with the harness, the forward force pulls the tow axes forward thereby reducing the space between the pillow pads, thereby increasing the likelihood of supporting the head in a front impact.

Figure 14:
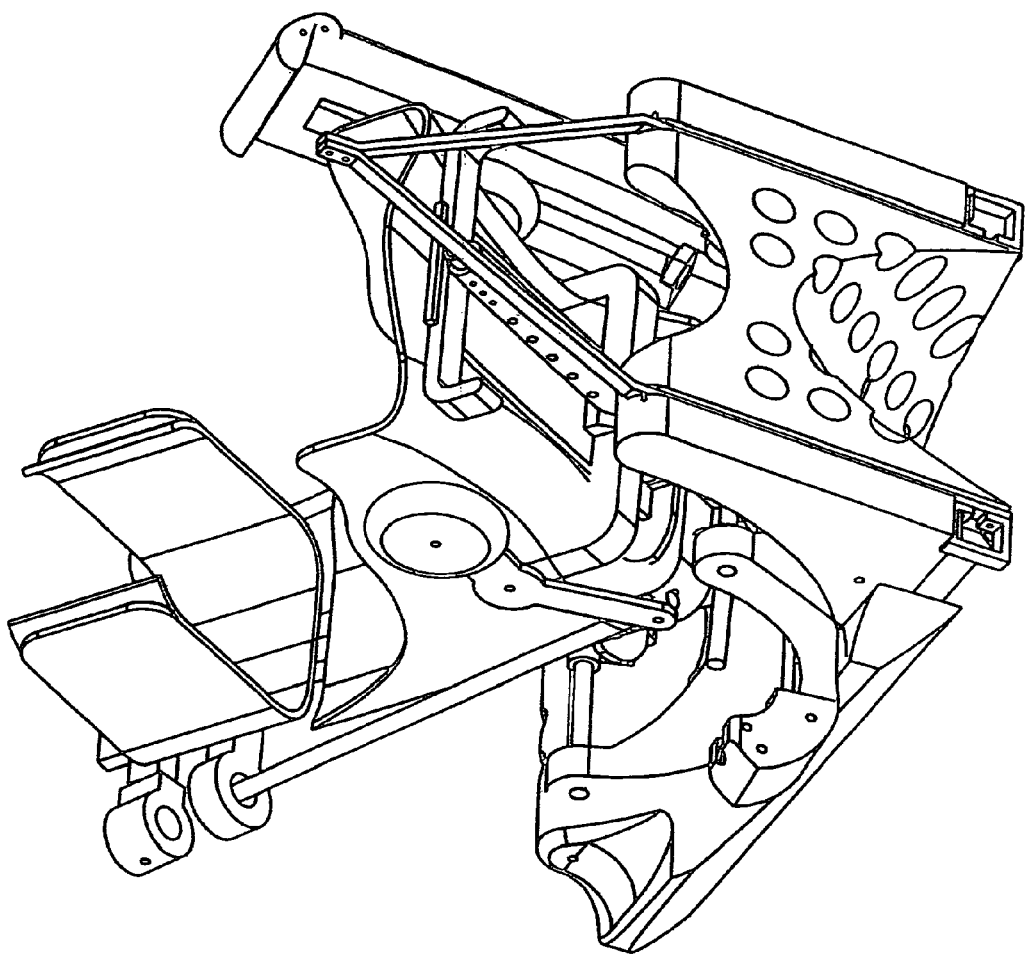
FIG. 14 shows a rear facing CISM (using the same base, sub-base and support cradle as for the front facing CISM) the rear facing CISM is shown in the normal operating position has. The figure shows the retracted undercarriage and wheels along with the retracted handle. These are extended when the shell is released and are used to wheel the shell by the parent or guardian of the child.
Figure 15:
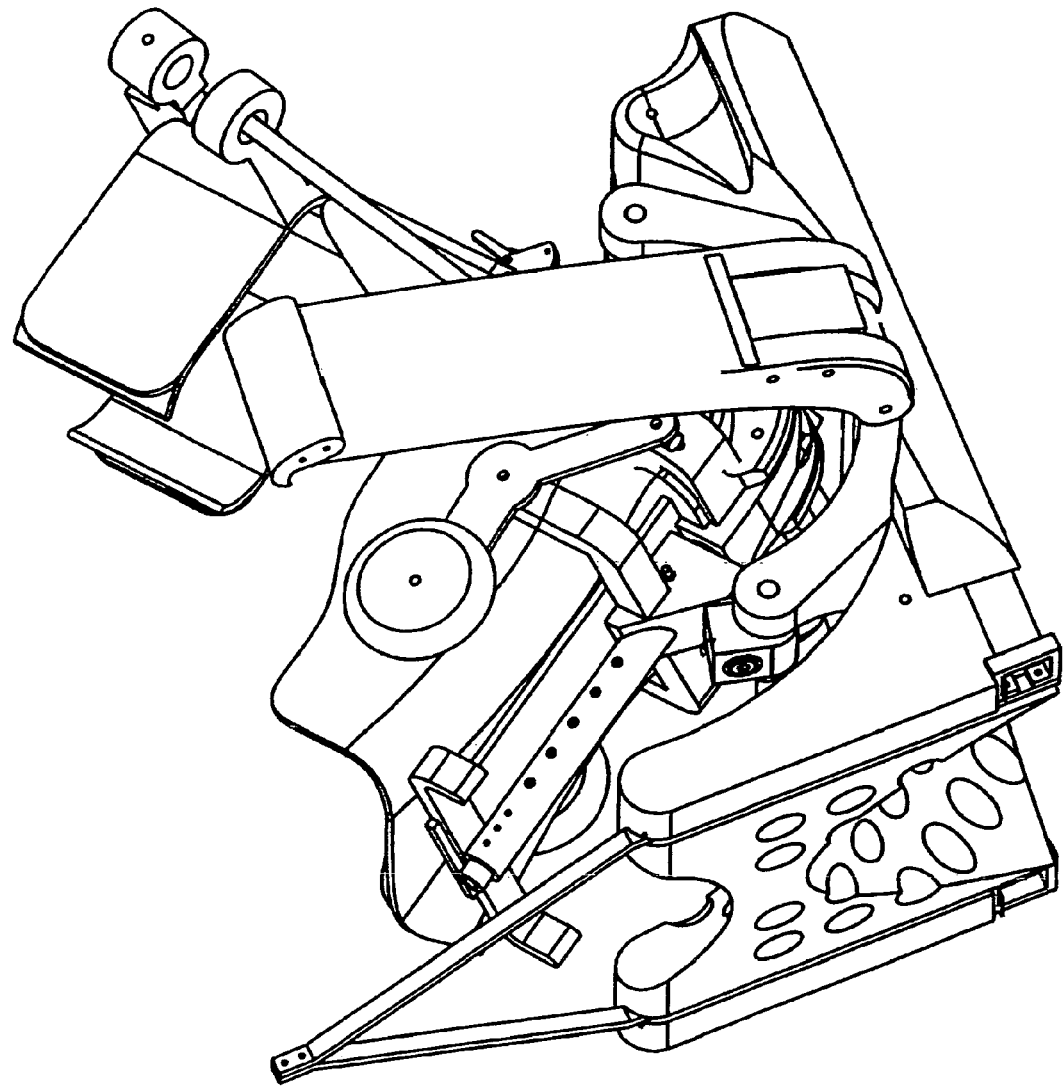
FIG. 15 shows the another view of the rear facing CISM in the normal operating position.
Figure 16:
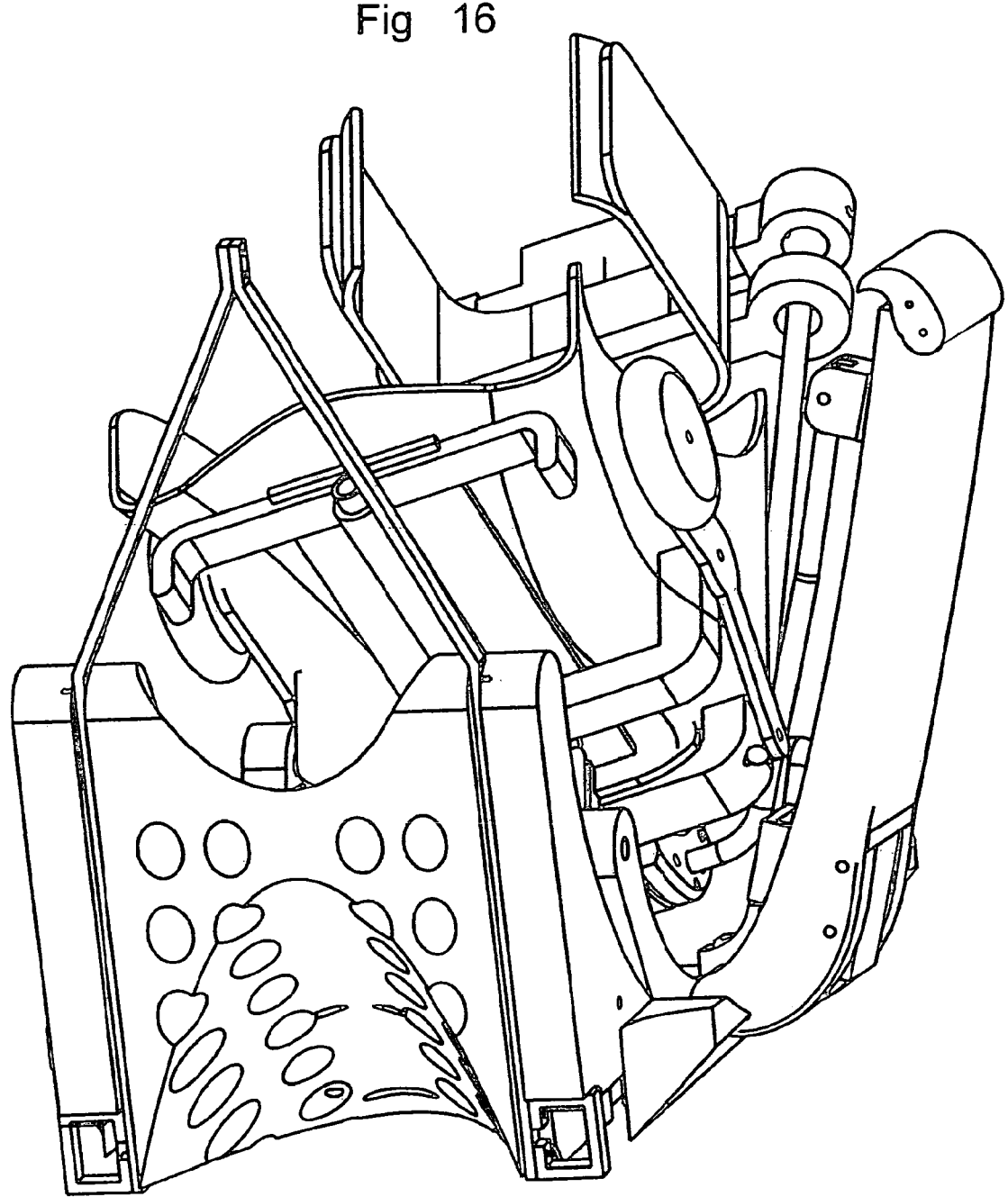
FIG. 16 shows the rear facing CISM under lateral acceleration.
Figure 17:
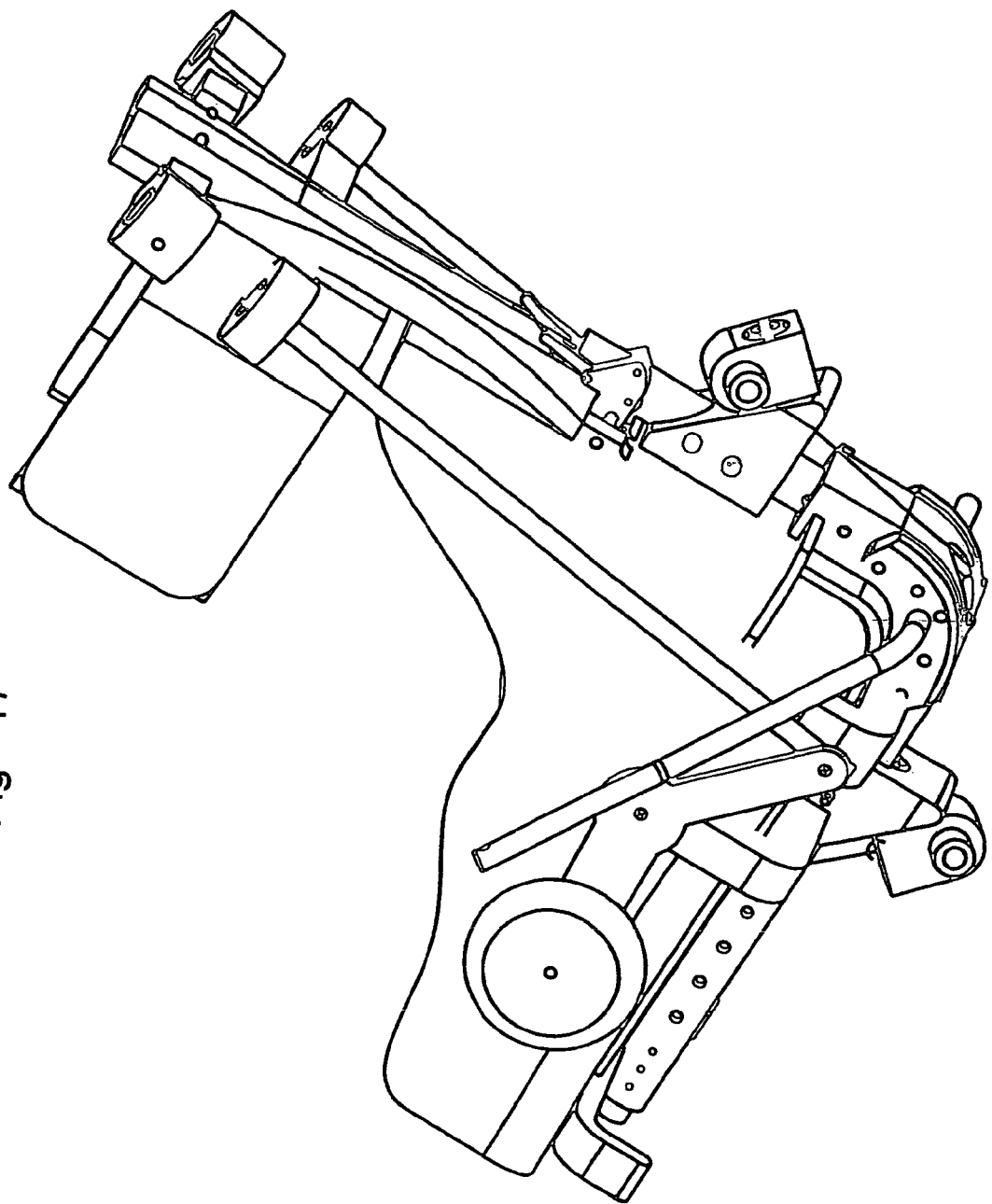
FIG. 17 shows the "cradle" that supports the shell (in this case the rear facing CISM is shown. The same cradle is adapted to support the front facing CISM also.

In the case of the rear facing seat for infants, the shell is positioned in the reverse direction on the cradle—see for example FIG. 14. While the same arrangements for the harness, shoulder pads and pillow pads may be used, as the main front impact loading is now on the back of the seat (which is the front of the vehicle) a conventional soft harness may be used.

For side impact and acceleration the same cradle swing mechanism works. A simplified version of the upper assembly is used in this embodiment for the rear facing seats may be seen in FIGS. 14, 15, 16, 17. Here the Torsion "T" bar is used to provide differential movement between the head and upper body and the lower body that moves with the cradle with inertial lateral loading. The Torsion "T" bar is inserted into the front spine and held with the same pin that held the shaft with the latch for the semi rigid harness for the front facing seat. With an inertial loading of the head the headrest pushes the torsion bar that twists to accommodate the differential movement of the head relative to the thorax.

Notably all relative motion of regions of the anatomy of the occupant, are by design arranged to conform the axes of natural movement. In this case the rotational movement of the spine and neck and the flexural movement of the spine and neck.

The rear facing seat is shown with a retractable undercarriage and handle that can be extended when the shell is removed from the cradle and wheeled for the convenience of the mother/guardian. The handle has a unique arrangement with the retracting mechanism allowing control of the retraction and extension with the handle alone. An extension element may be added to the handle to make it extend further.

Figure 34:
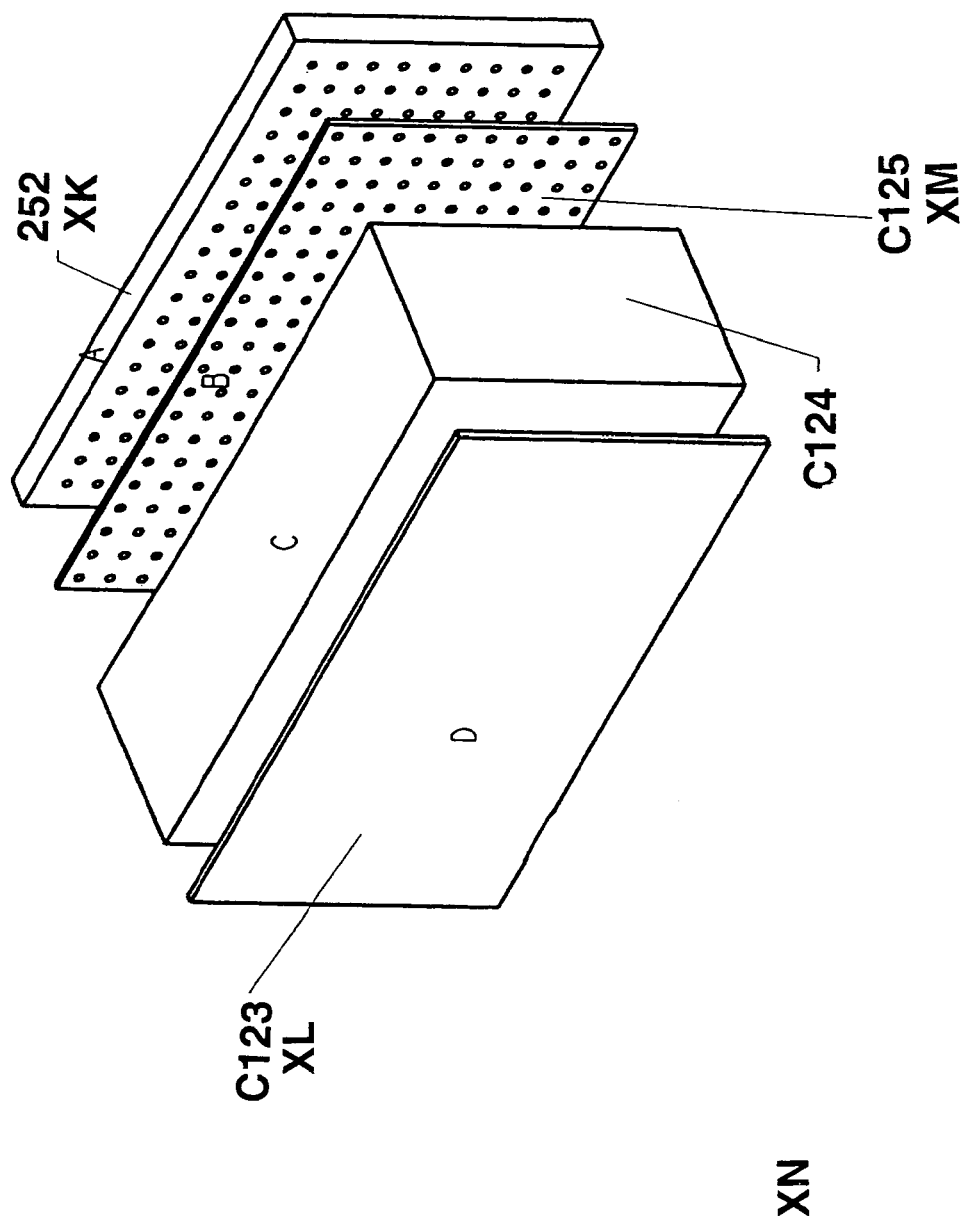
Figure 37:
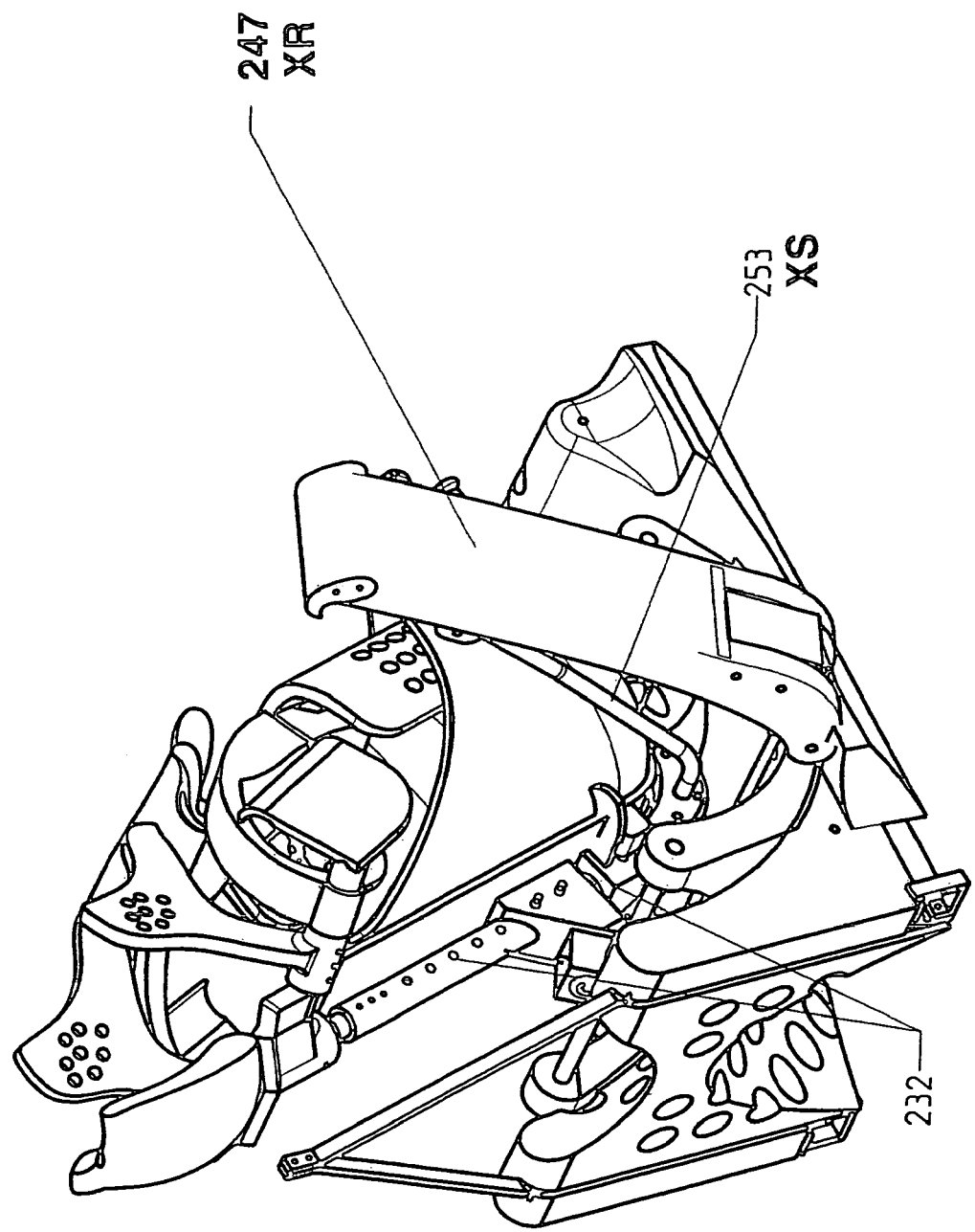
Figure 38:
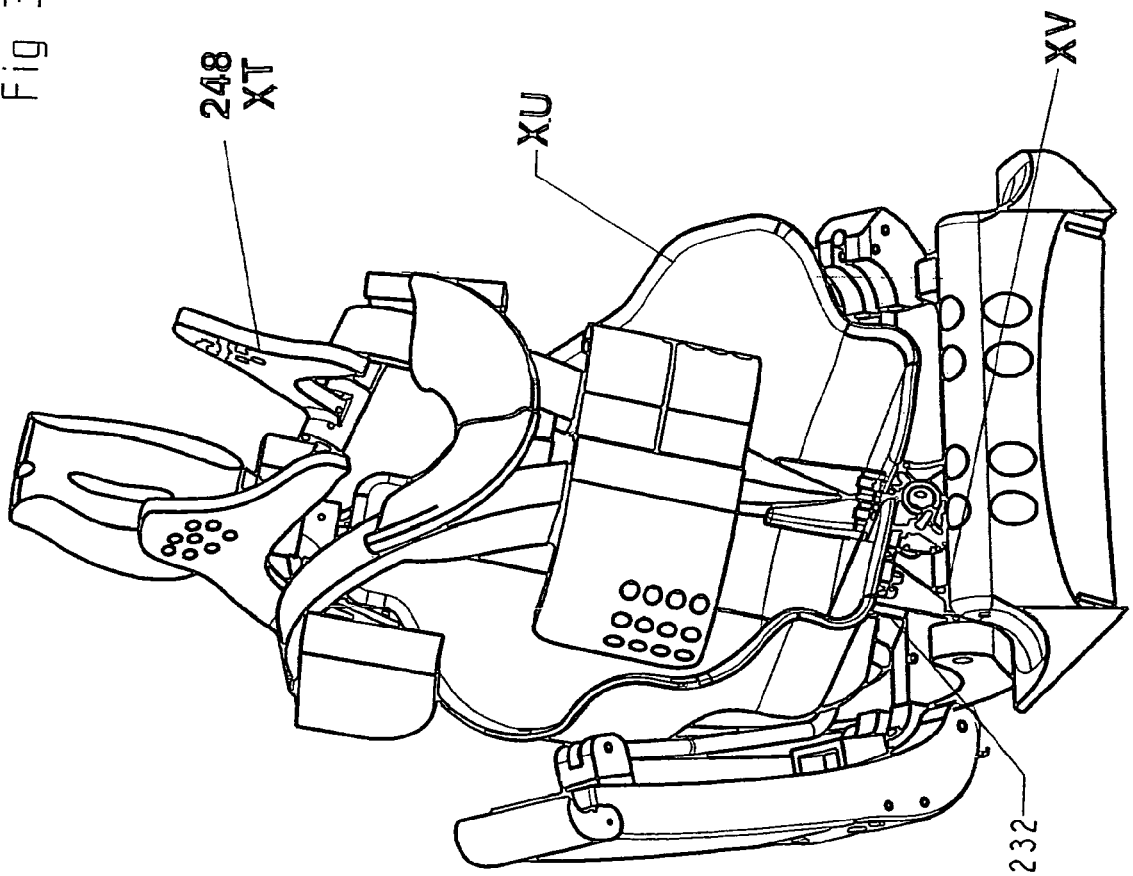
Figure 39:
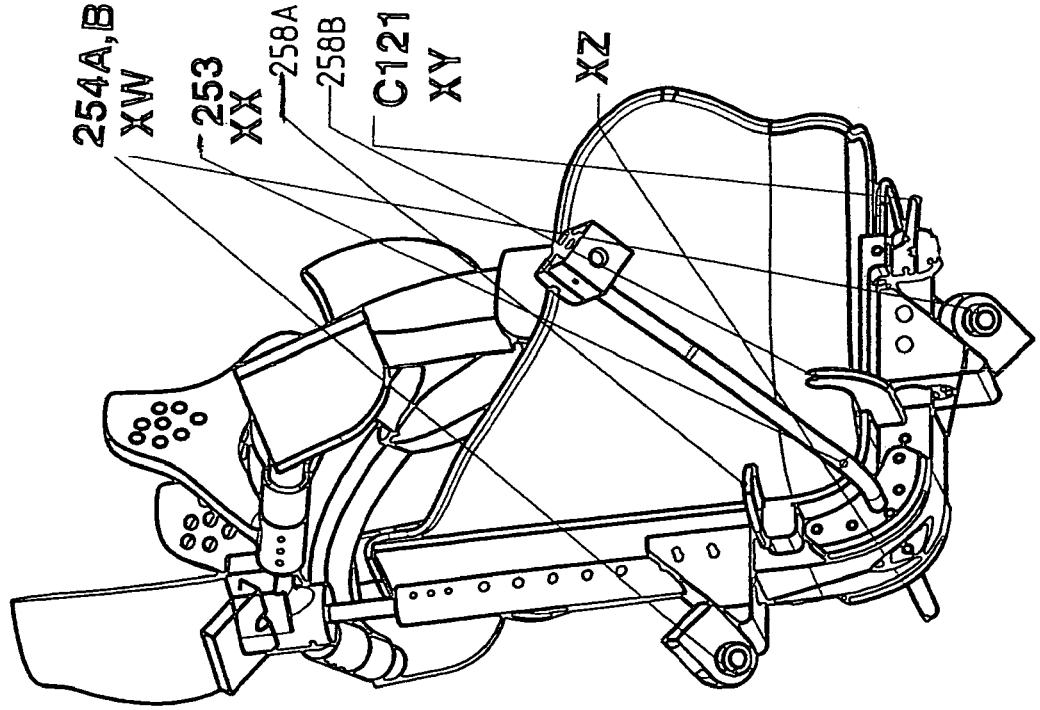
Figure 40:
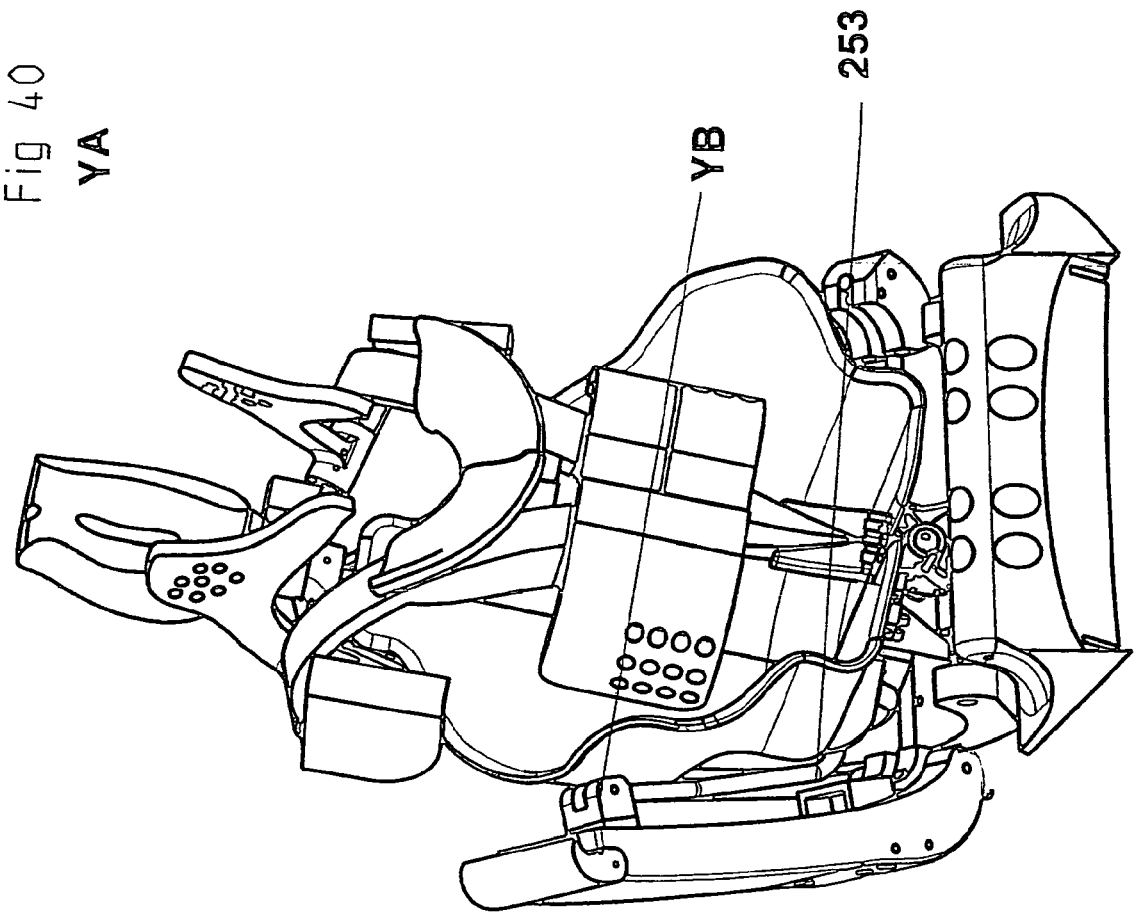
Figure 41:
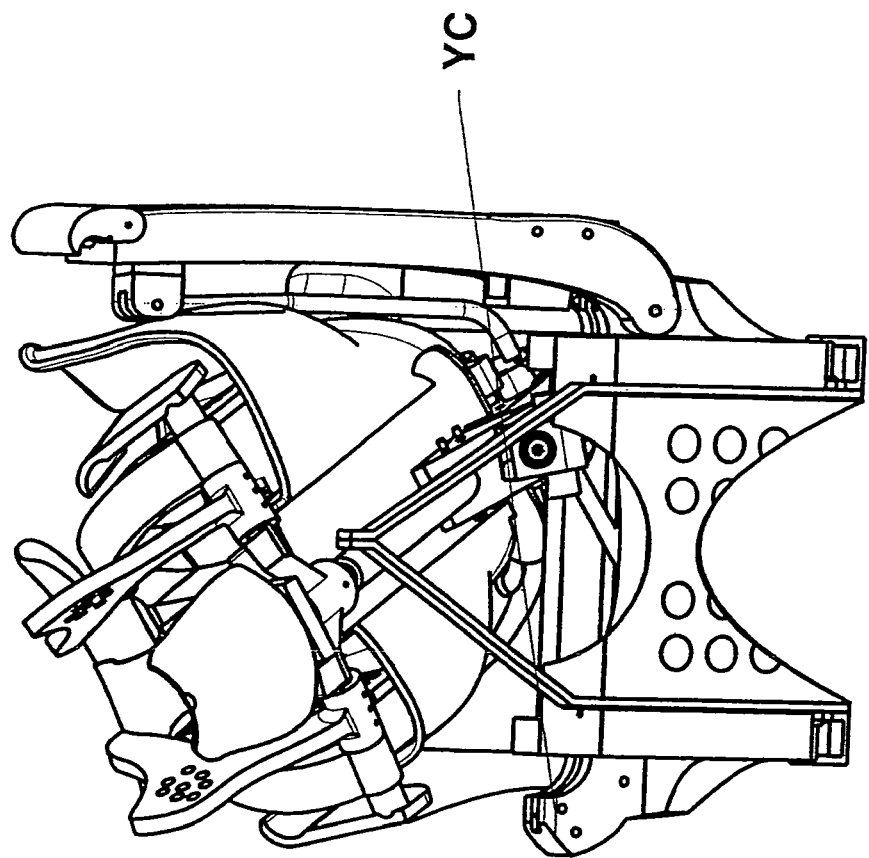
Figure 42:
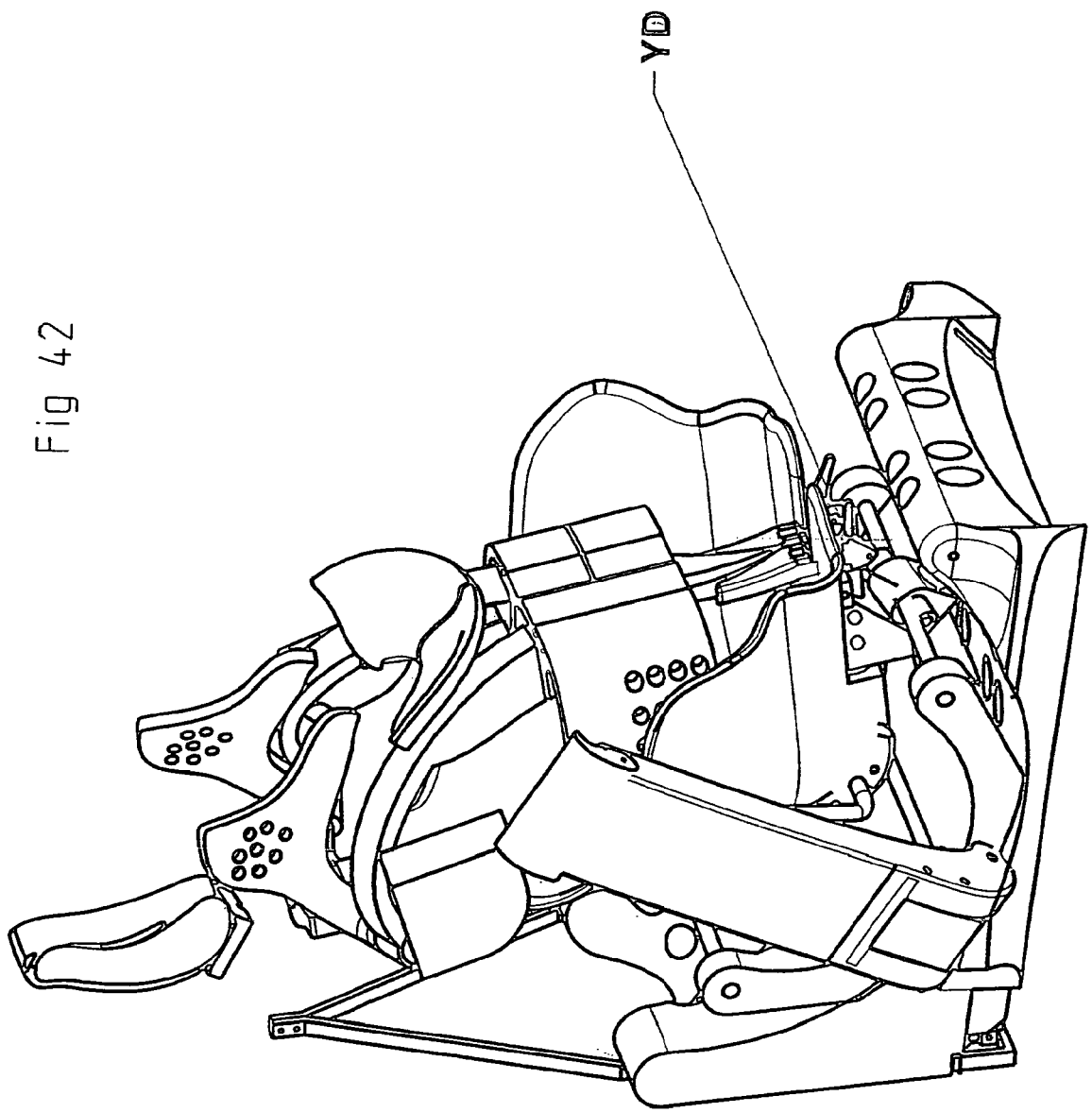
Figure 43:
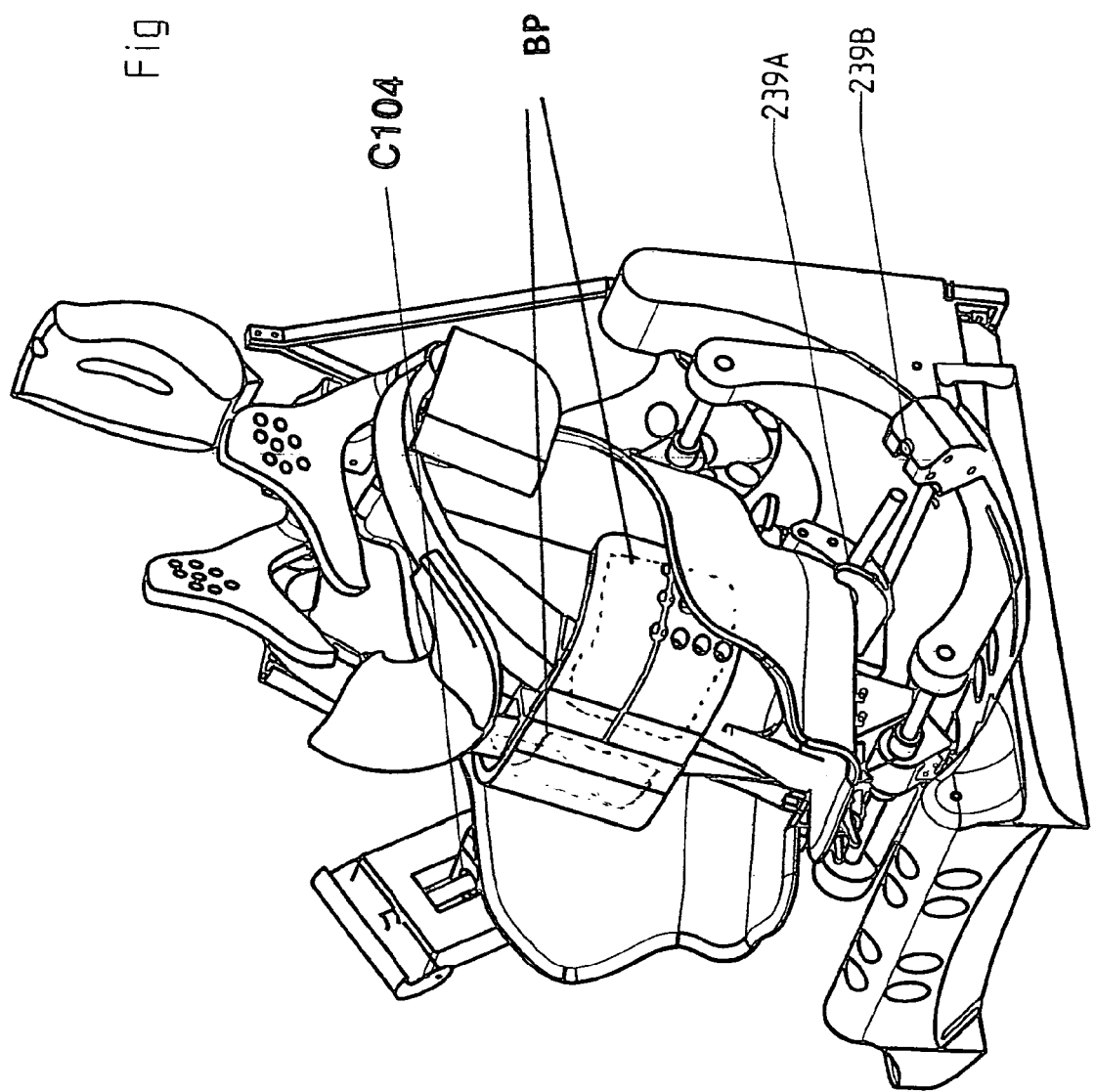
Figure 44:
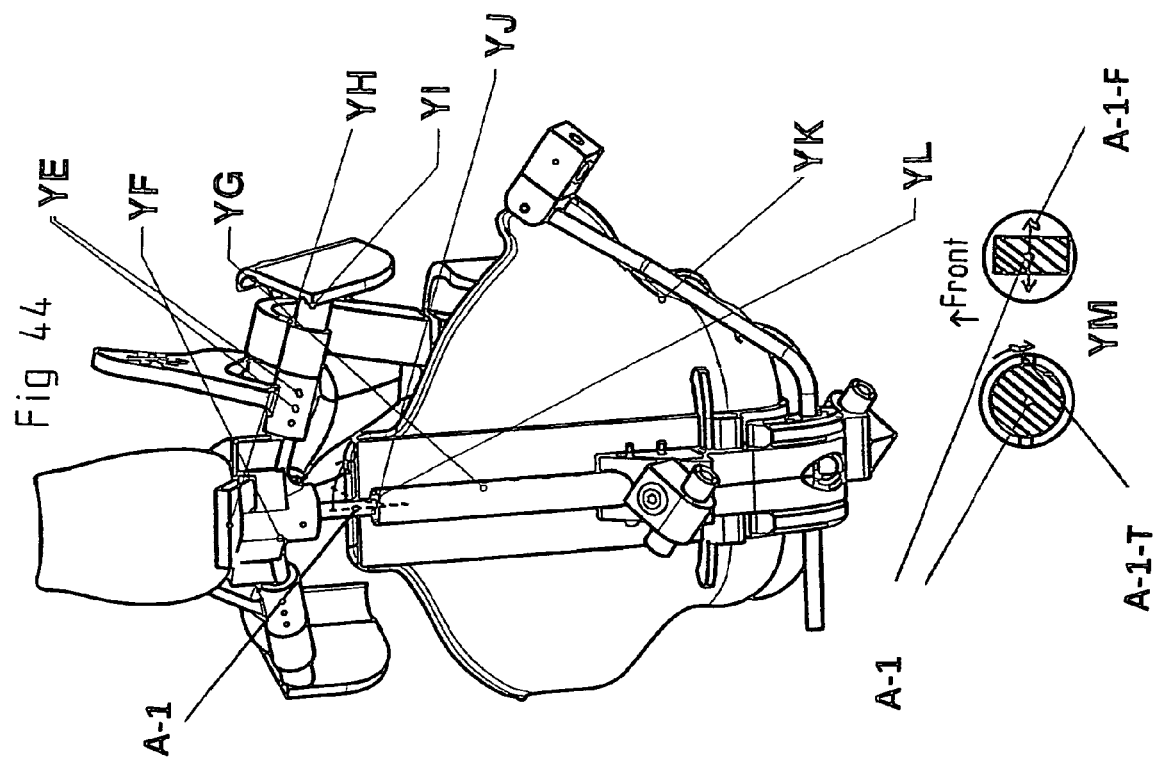
Figure 45:
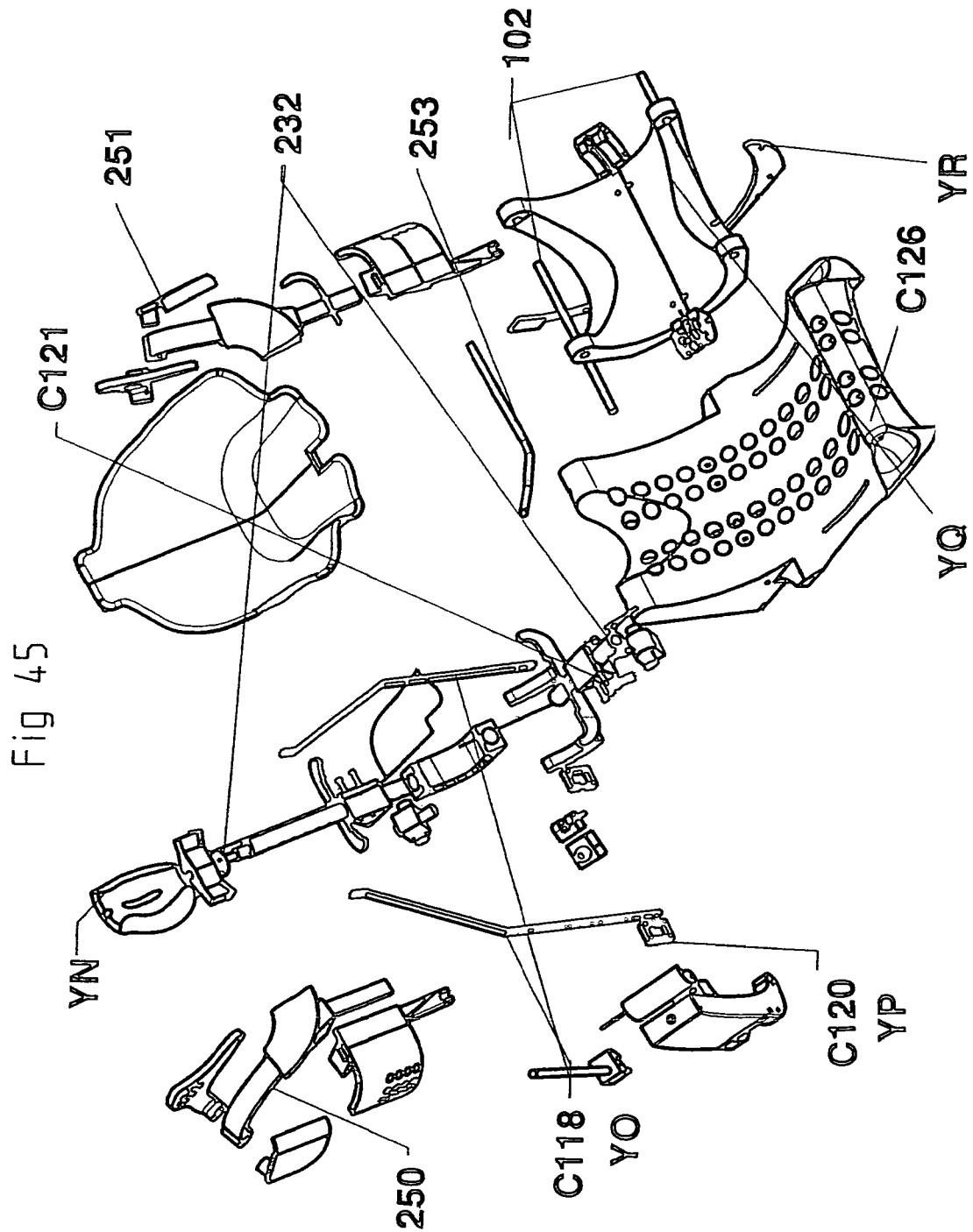
Figure 46:
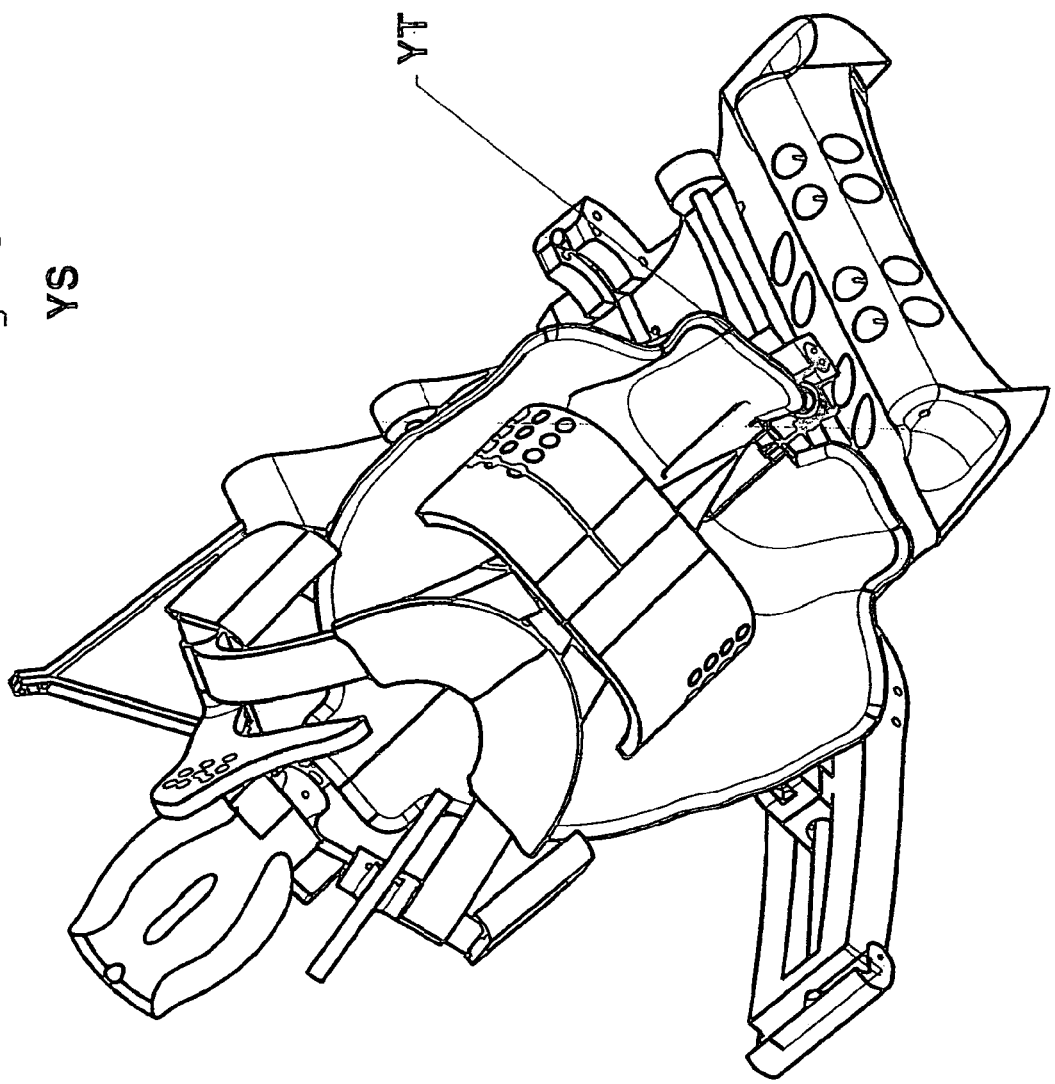
Figure 47:
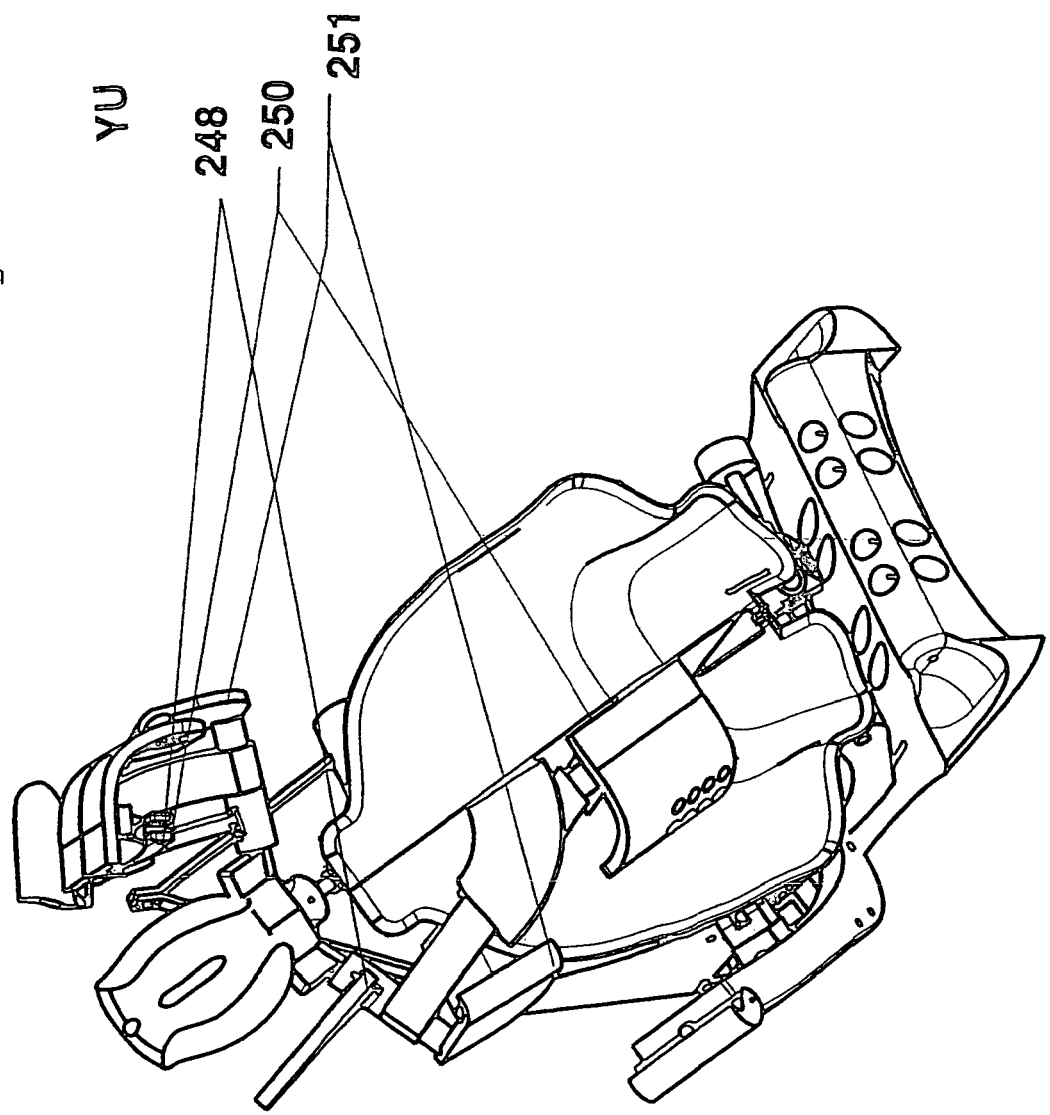
Figure 48:
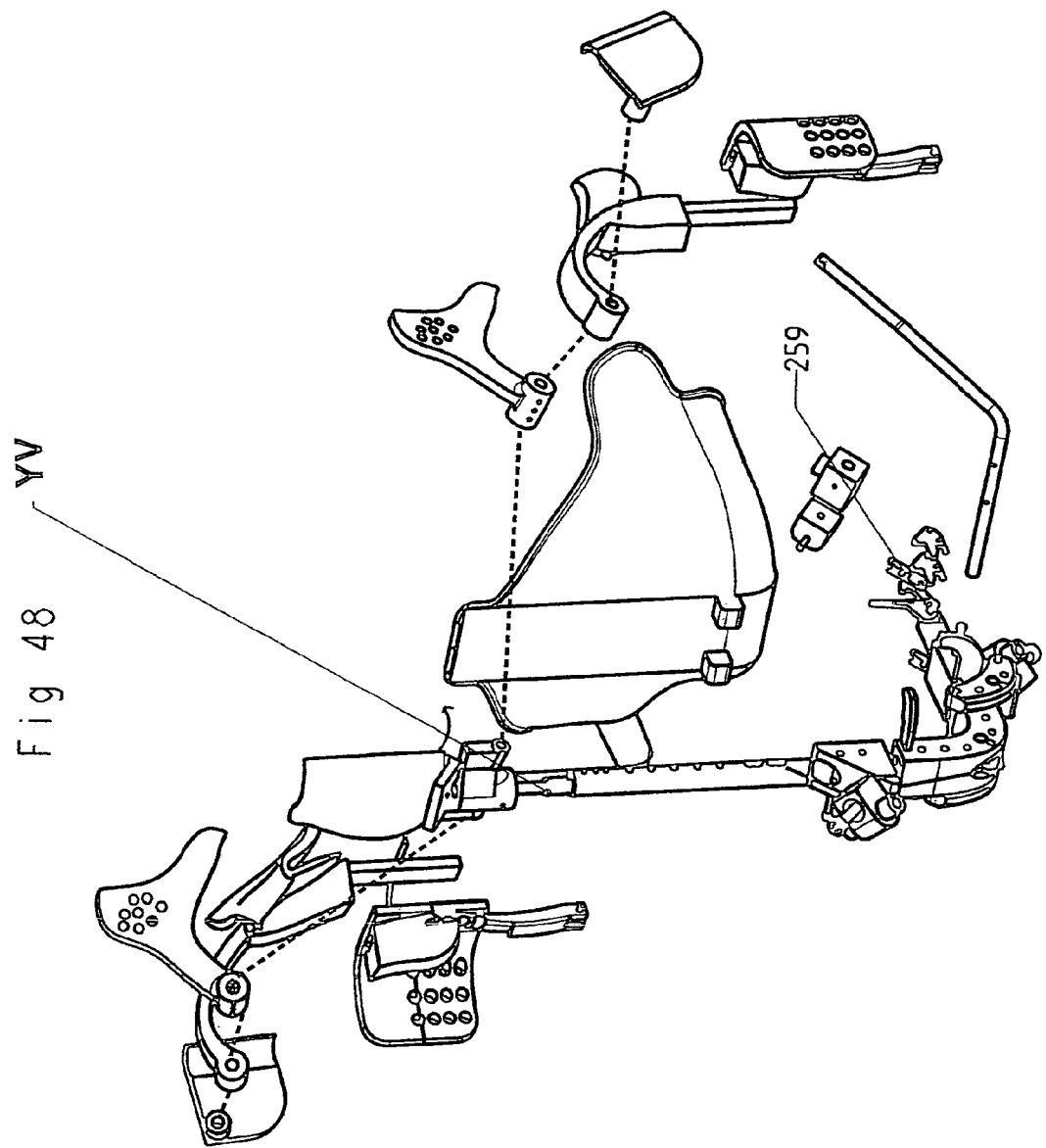

In all embodiments with the reorienting shell, the position of the center of mass relative to the support points that produce reaction forces determines the direction of reorientation. It should be ensured that the reaction forces should be lower on the side that needs to move more against inertial load due to the acceleration. FIGS. 34, 36 illustrate a passive air conditioning system for any shell type support mechanism for an occupant in a vehicle. Here a support shell has a substantially rigid structural shell with perforations, within which is interposed adjoining it, a flexible membrane with perforations staggered to the perforations of the structural shell and adjoining it a foam layer that is adapted to absorb air on expansion and release air on compression, within which is a gas permeable membrane adapted to be adjoining the occupant, such that during transient lateral accelerations of the vehicle in a first direction the inertial mass of the occupant compresses the foam thereby forcing air to the occupant side as the membrane with perforation s adjoining the structural shell with perforations will as a result for the force of compression and as a result of the staggered perforations, provide a seal against the transfer of air through the structural shell and wherein during transient lateral accelerations in a second direction the inertial mass shifts away from the foam and permeable membrane thereby allowing the foam to suck air from both sides, wherein the low pressure created next to the perforated membrane separates it from the perforated structural shell thereby allowing the staggered perforations to permit the infusion of air into the foam from the outer surface of the structural shell, thereby creating a mechanism for fresh air to enter the support shell for enhancing the comfort of the occupant. Notably the staggered spacing of the structural shell and the membrane may be even statistically staggered.

Alternative Embodiments

An embodiment of the CISM as illustrated in FIGS. 21-30, has two sliders and two corresponding pivots therefore having two slides on two axes each with pivotal linkages to the CISM. One or both of the sliding mechanisms have shock absorbing elements. In the figures one of the sliding elements 107/111 on 102 has a pair of shock absorbing elements inside the tube 102 and a pin that serves as the pivot 233 engages the shock absorbers on each of the two sides for compression only. The slider 107/111 has a hole through its body to accommodate the pin that in turn goes through the slot in 102. Each of the two shock absorbers on the two sides of the pin 233 attached to 107/111 compress in the event of lateral acceleration of the CISM, which can be due to impact or centrifugal force as the vehicle negotiates curves. There may be multi element shock absorbers that have multiple compression characteristics to cater for the lower acceleration of centrifugal action, and the higher acceleration of impacts.

These figures FIG. 21-30 also show a head rest support Q101 which has two pivotally attached head rest flaps on it, with the pivot as far forward as possible so that on severe lateral acceleration the flaps are depressed thereby ensconcing the head to provide it a large surface area of support. The head rest flaps as shown also have one or more holes in the ear area to ensure a clear path for sound to the ears of the child. Such holes don't compromise the structural strength of the head rest as under such severe acceleration the flap rests against the headrest support that does not need to have holes in it. The Head rest flap is also shown to have a recessed section near the front for the eyes so that the child has an unrestricted view. During severe acceleration the rotation of the CISM raises the level of the relevant head flap to provide support as high as required on the head. The present invention therefore has a solution that does not need to compromise the stimuli that the child can benefit from in the vehicle critical for its development, to enhance safety. Most other designs would need to have huge wings on headrest to provide the same support.

FIG. 21-30 does not show the ISOFIX or other latch mechanism in the interest of clarity. This will be mounted on the curved bars shown at the bottom of the seat.

Any of the embodiments of the Child seat and CISM described herein may utilize a pre-tensioner device if available in the vehicle. The car belt is threaded over a bar or lever that is pivotally or slidably attached to the seat frame. On activation of the pre-tensioner the bar or lever is moved and this may activate a cable or other mechanical linkage that tightens the child's harness.

The side arm 239 if on the door side of the child seat, it will also perform the function of an impact barrier to further protects the child. The side arm 239 in some embodiments may be unlocked and either pivoted outwards or slid on yet another sliding arrangement out of the way to allow the CISM to tilt outwards to ease egress and ingress.

Figure 2:
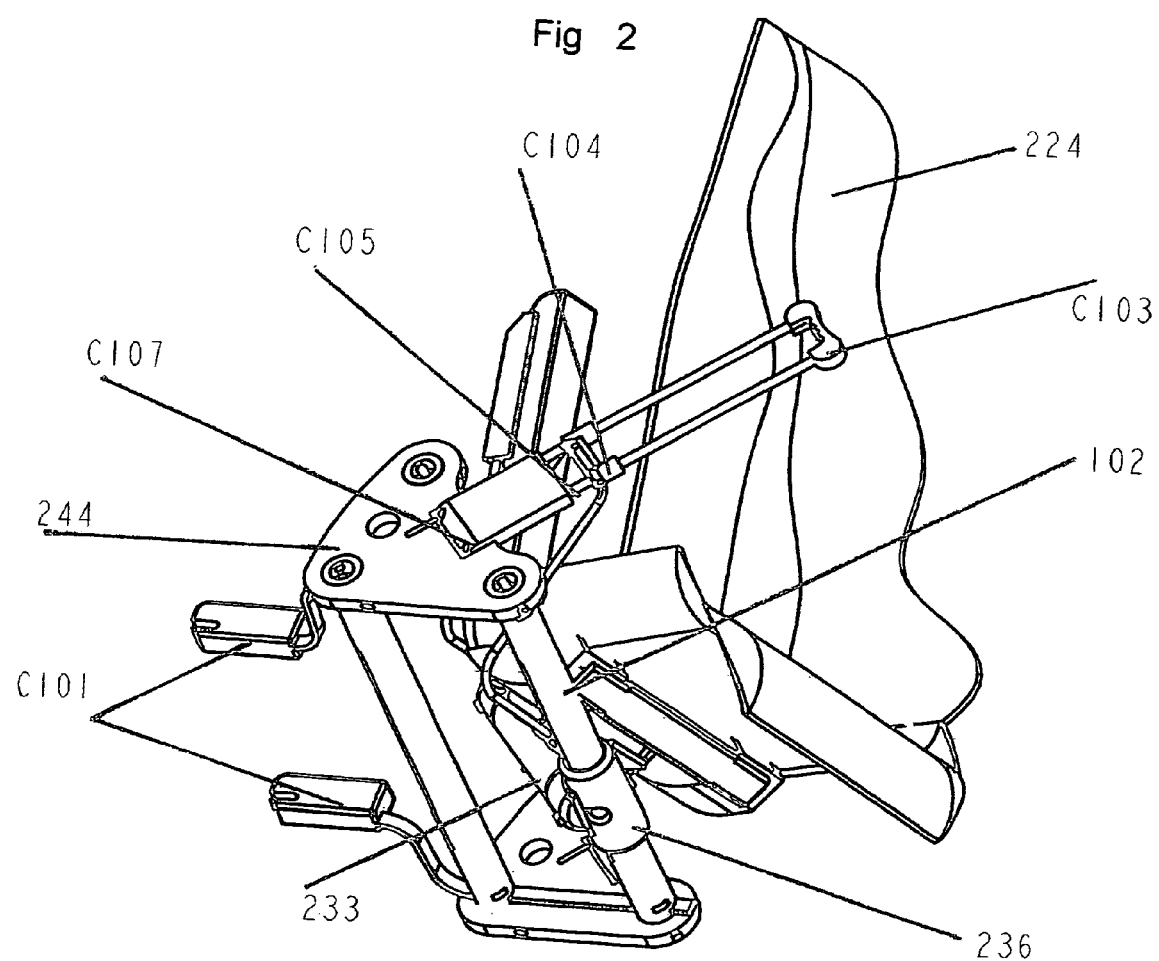
Figure 3:
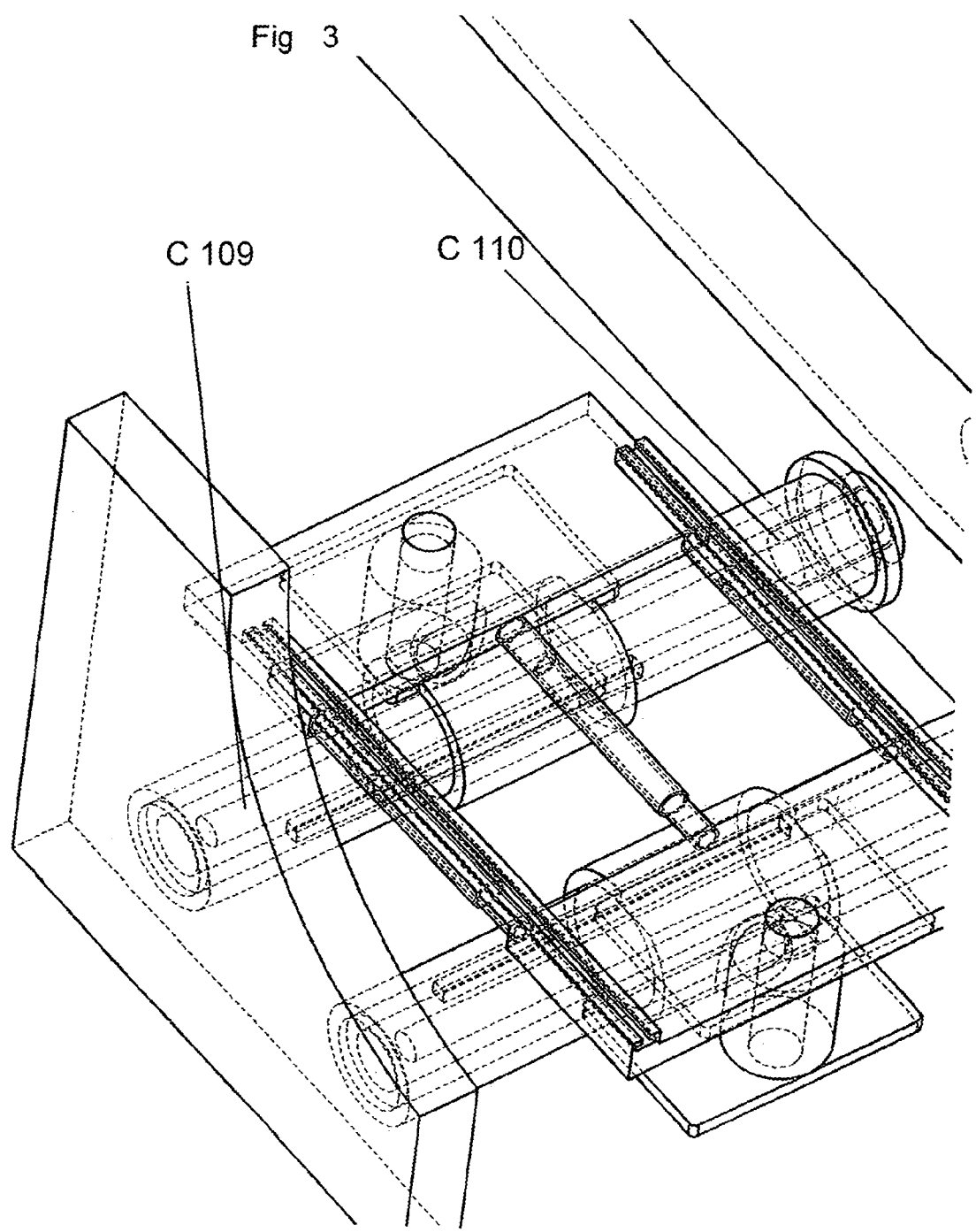
FIG. 3 illustrates an occupant support mechanism that is adapted to reorient during lateral accelerations. It is also designed to eject along slides for egress and ingress with worm drives activating the ejection.
Figure 4:
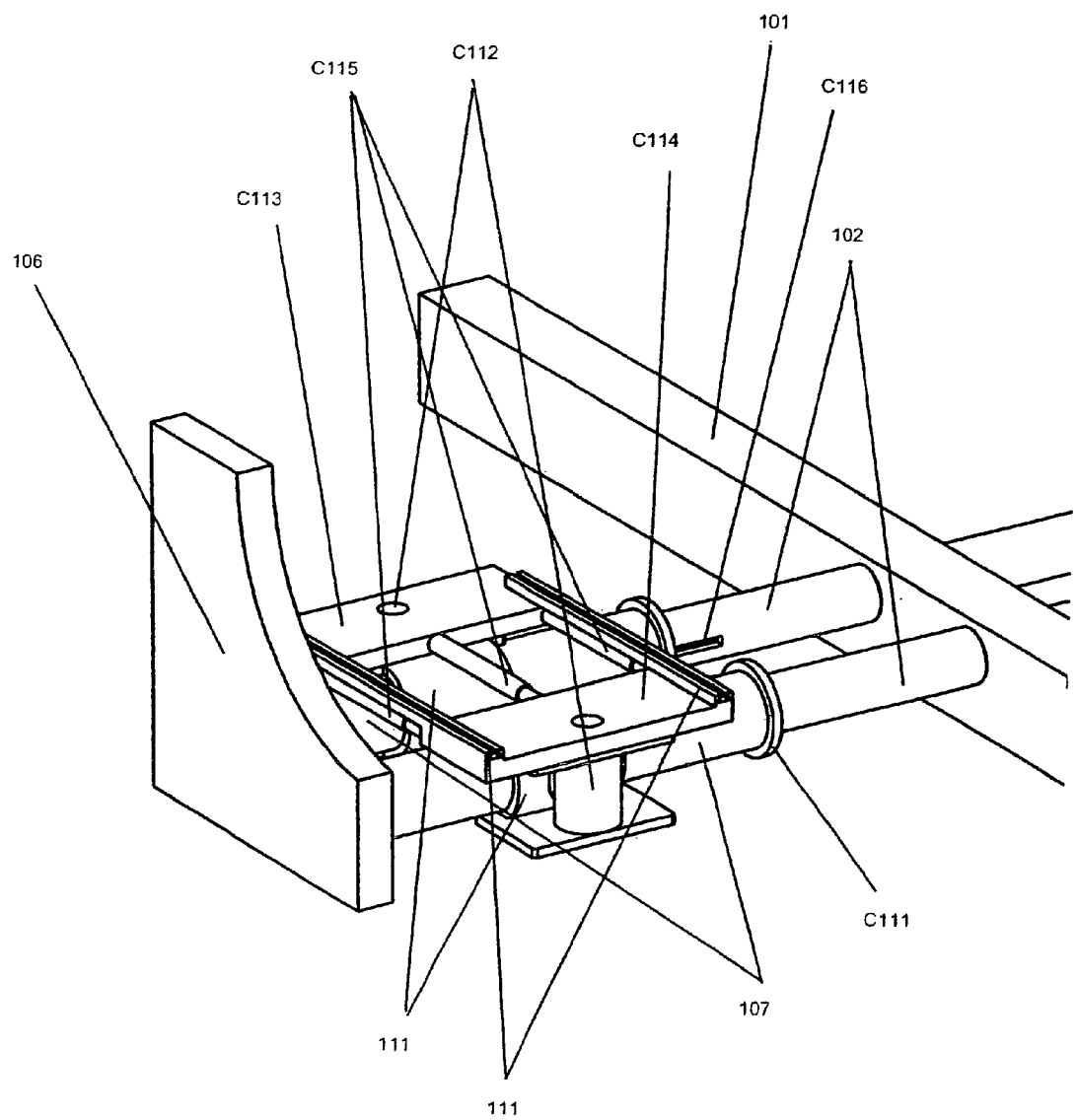
FIG. 4-7 illustrates the same occupant support mechanism from different perspectives.
Figure 5:
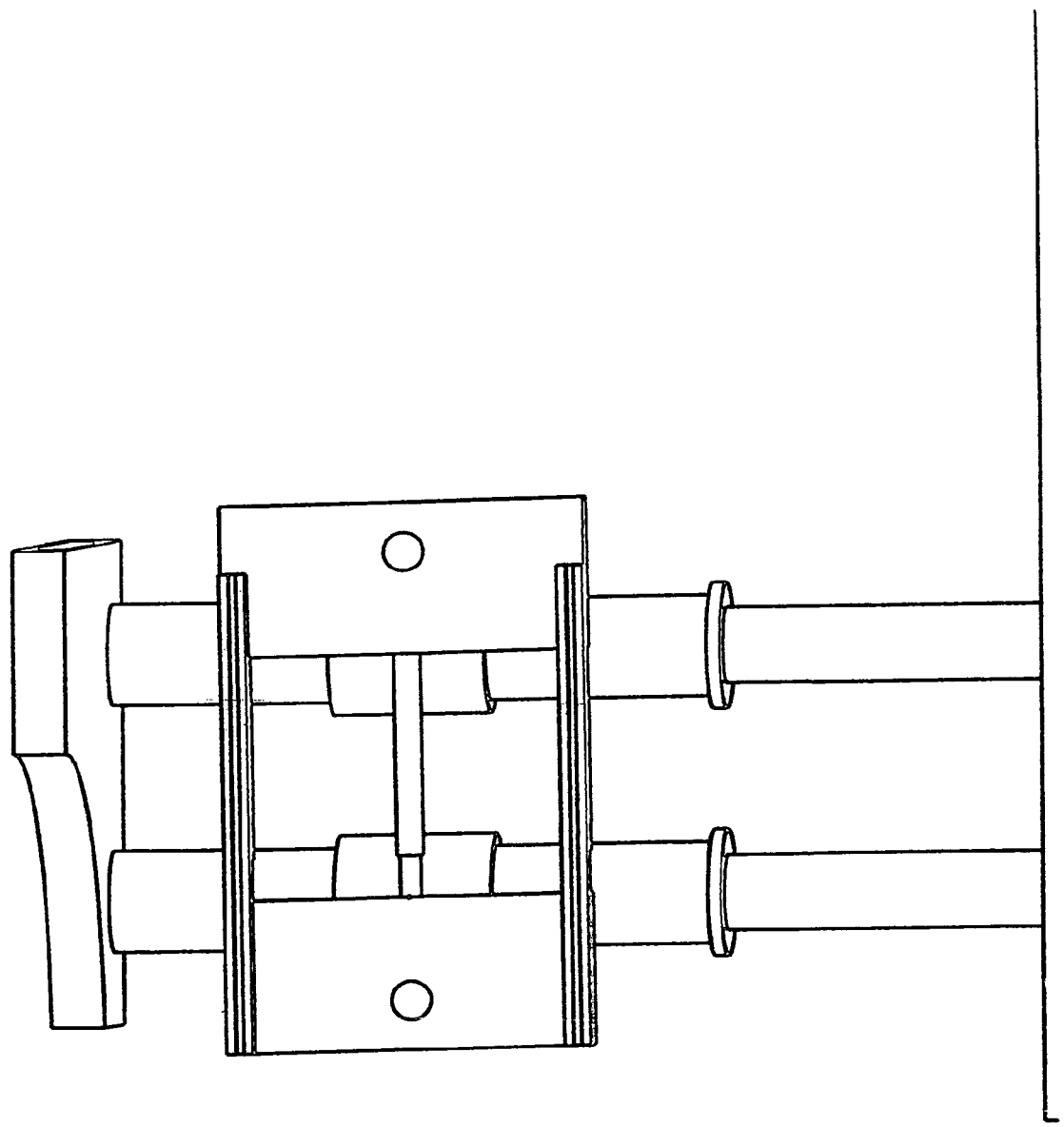
Figure 6:
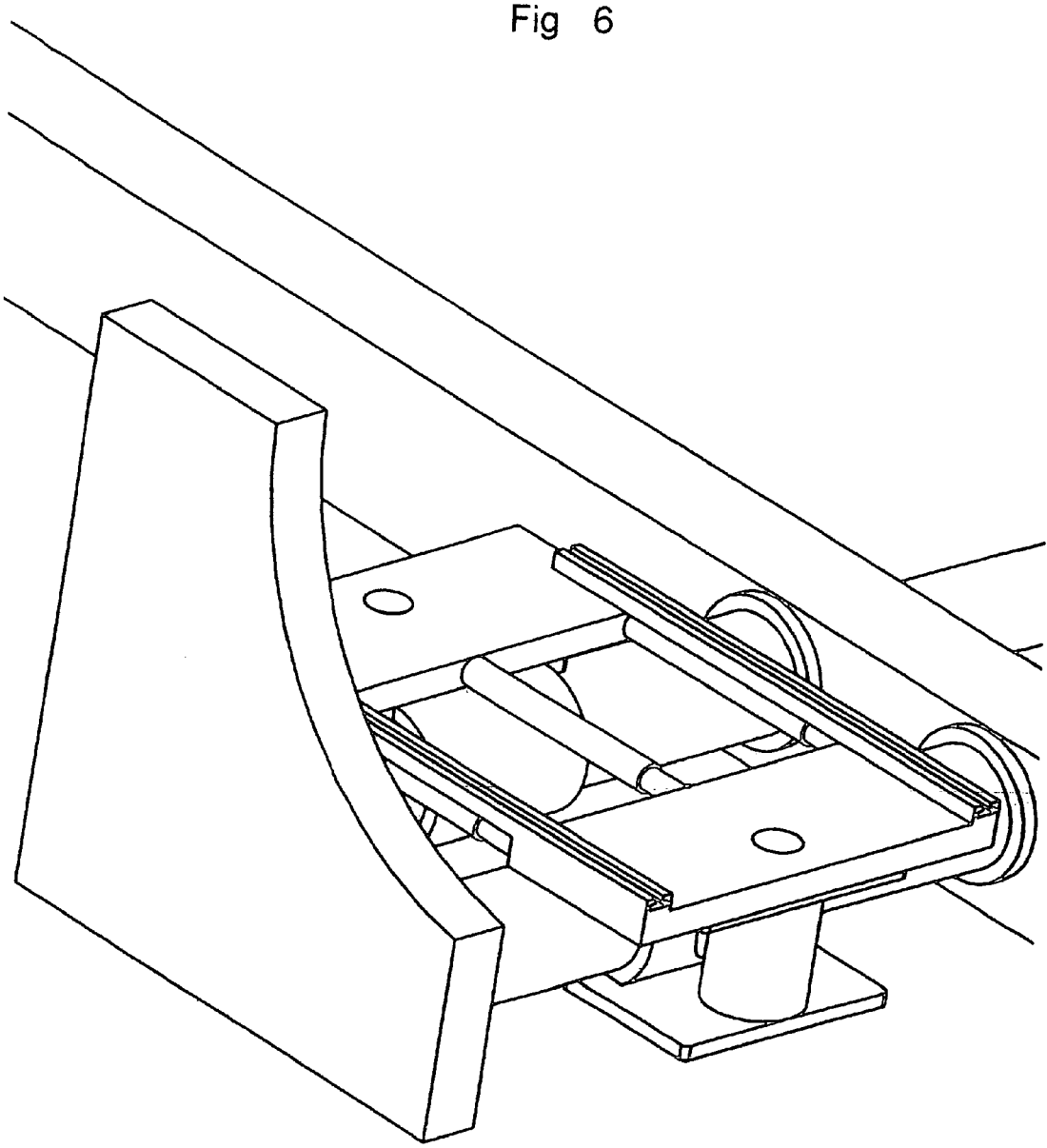
Figure 7:
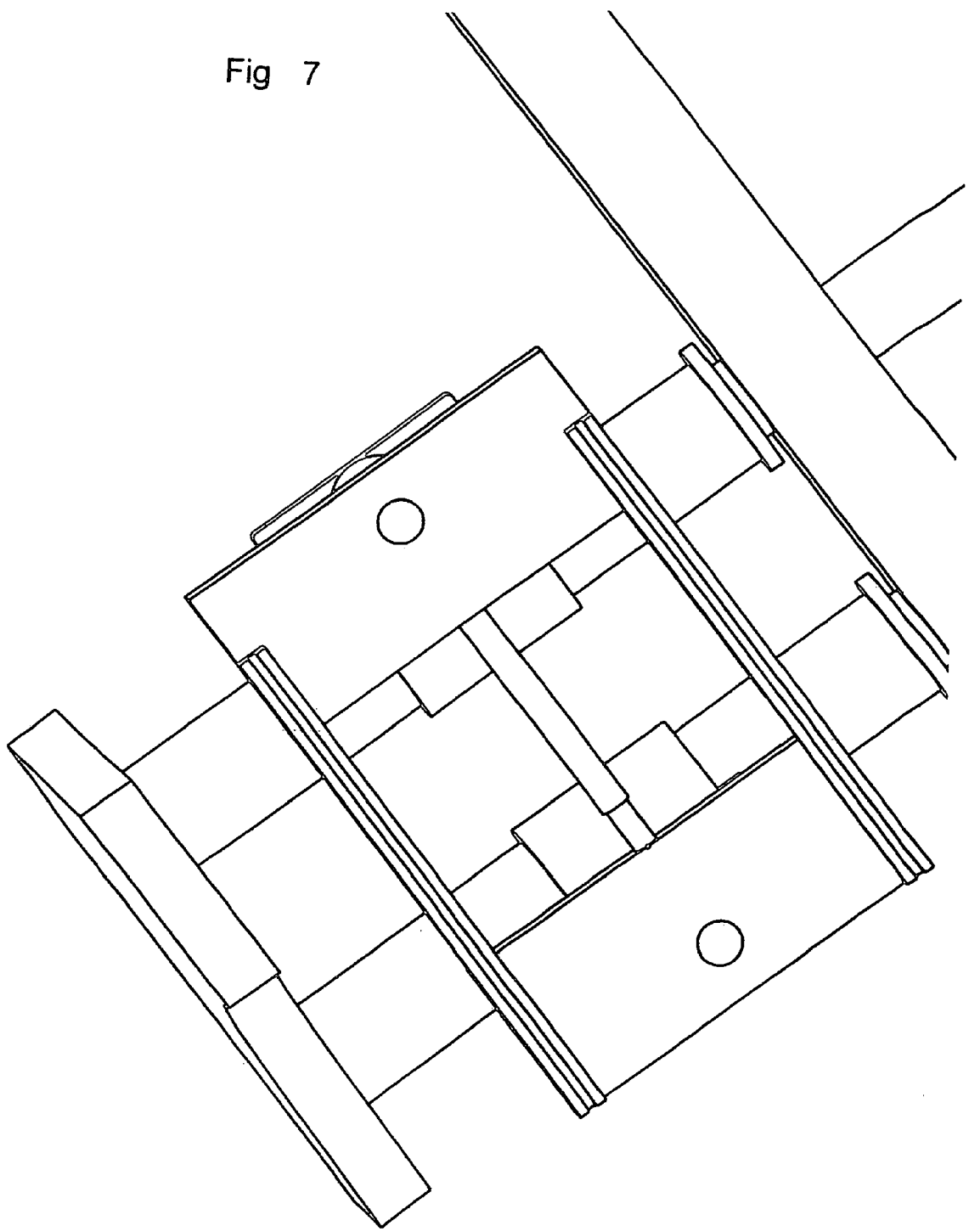
Figure 8:
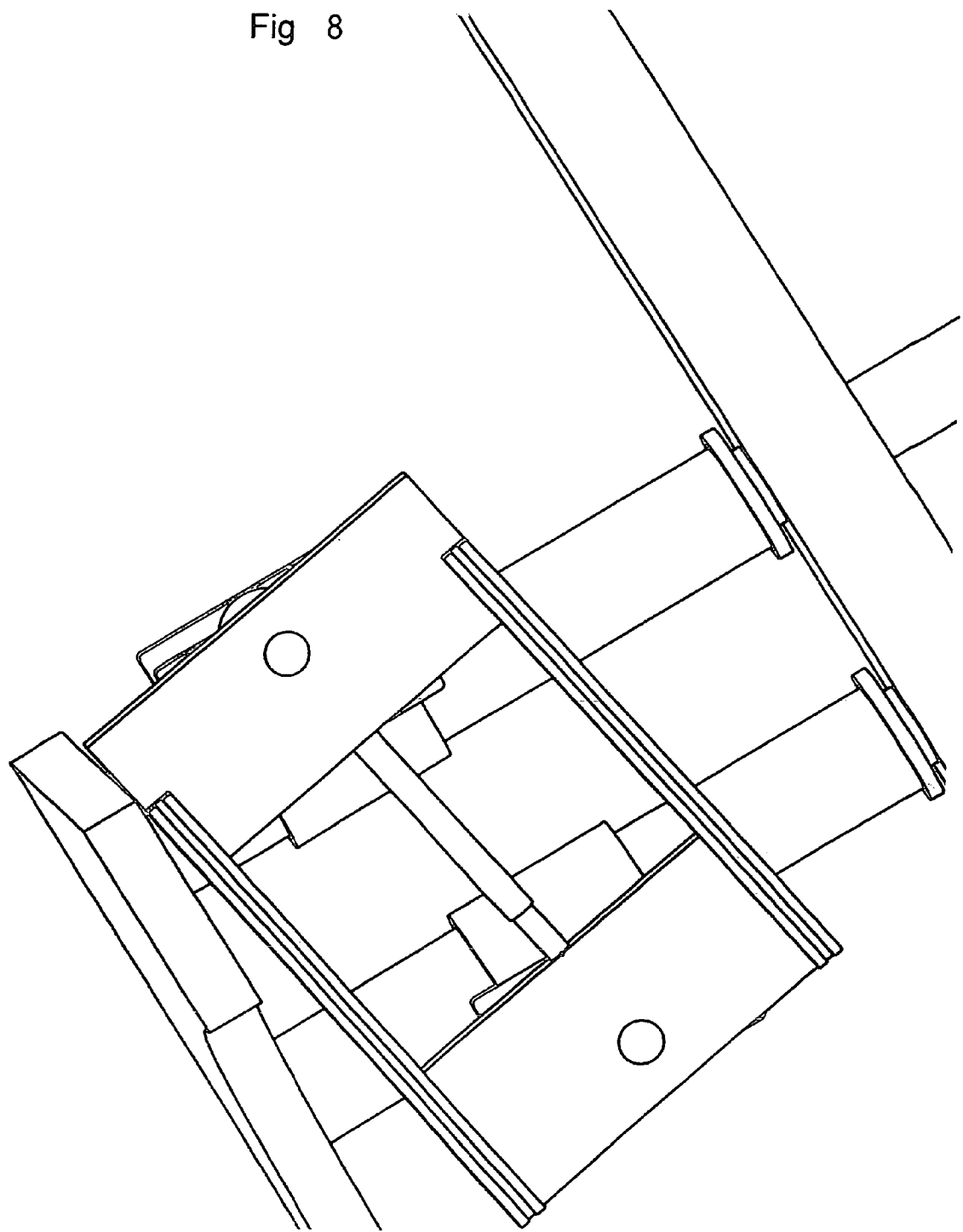
FIG. 8 illustrates the occupant support under lateral acceleration showing the reorientation to face the occupant away from the impact.
Figure 9:
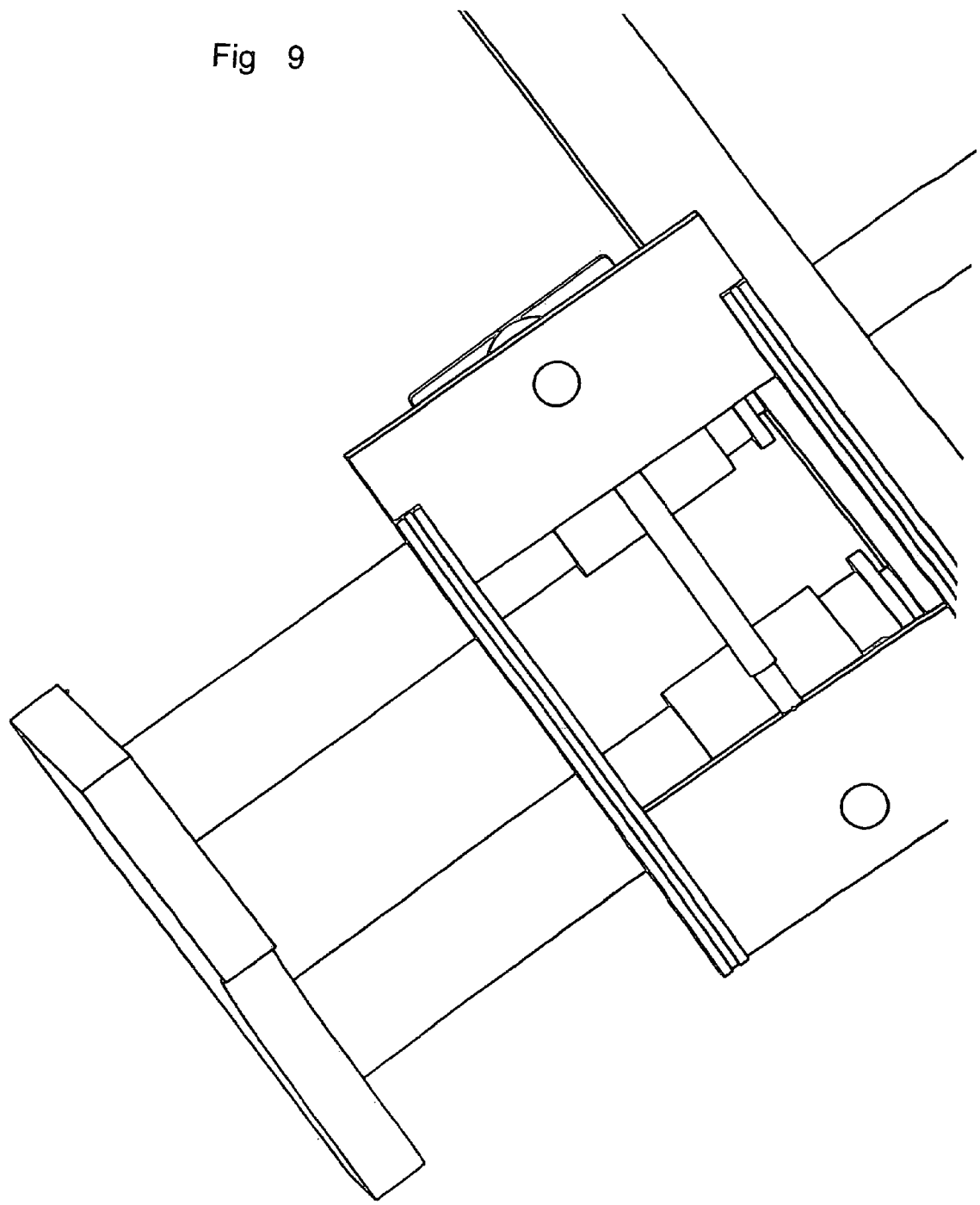
FIGS. 9,10 illustrates the movement after the initial impact where the occupant moves away from the impact.
Figure 10:
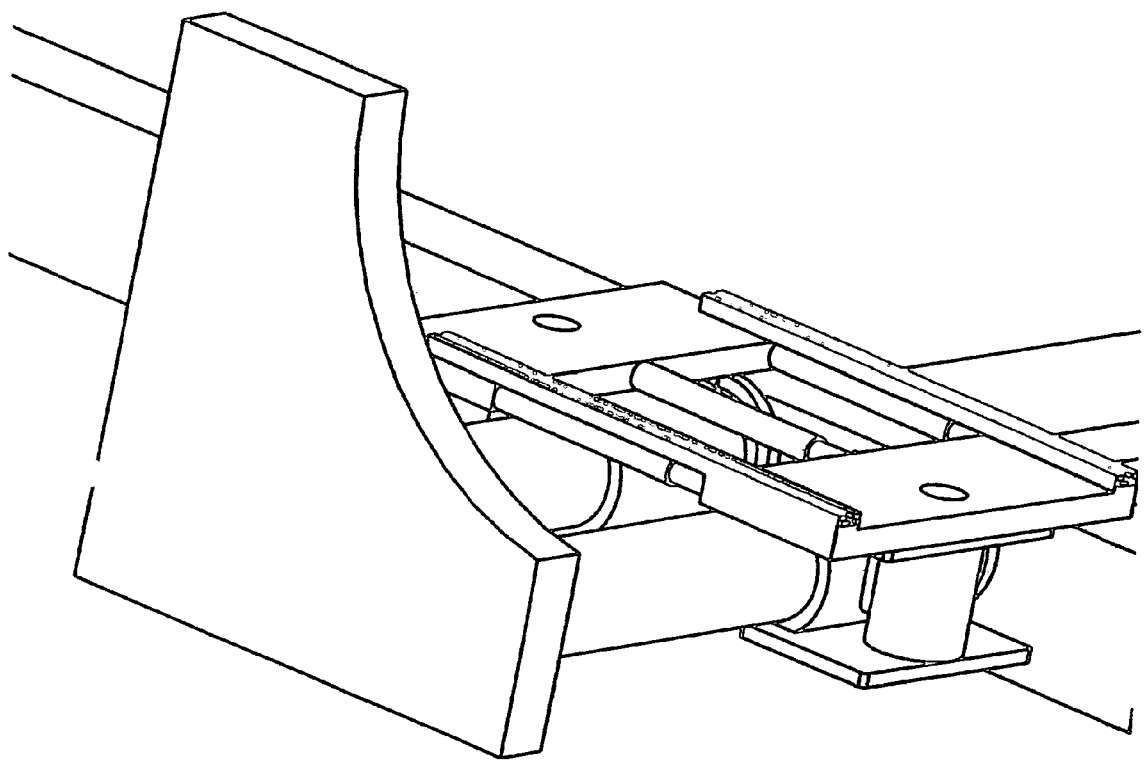
Figure 11:
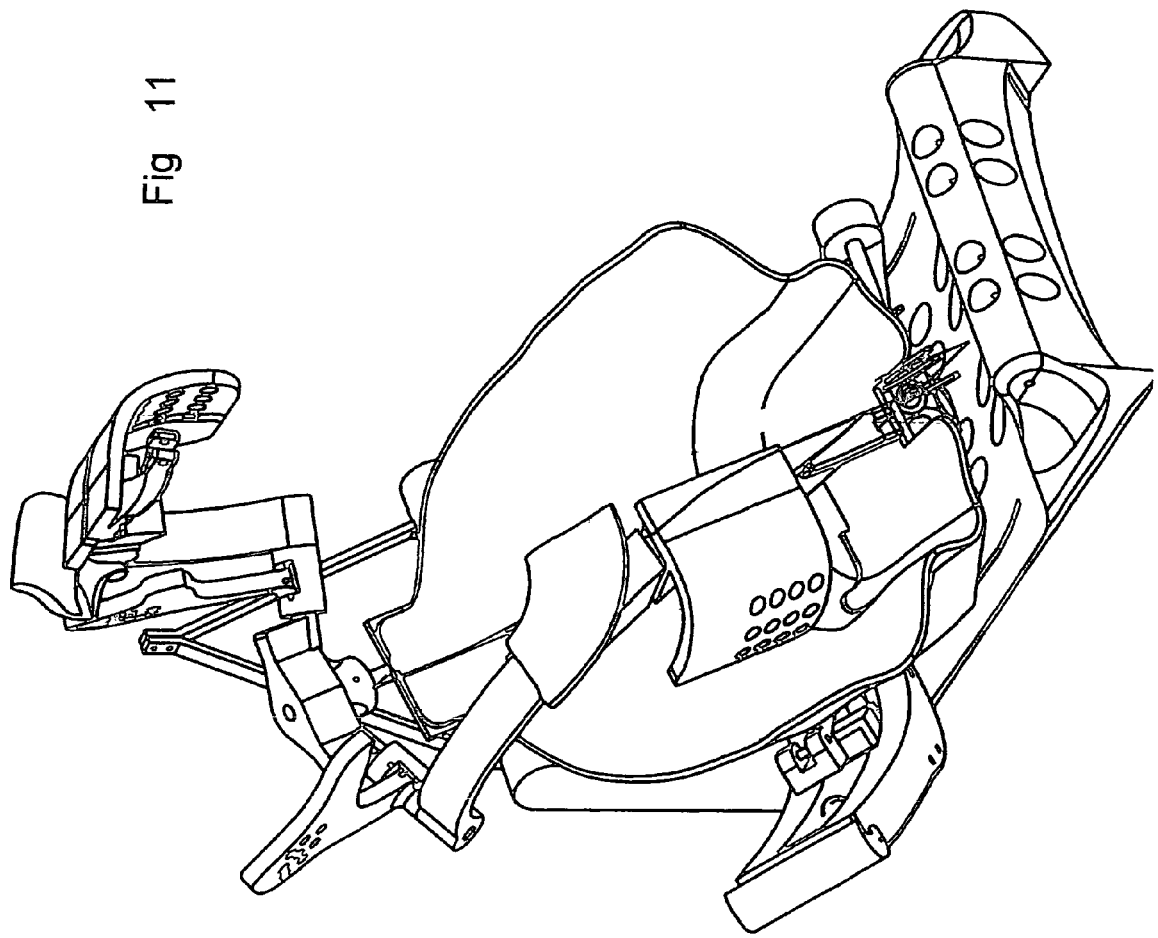
FIG. 11 illustrates a front facing CISM where the harness is in two parts (LHH and RHH) and each of them can be independently locked down. These harness parts are shown swung up away from the occupant to allow egress and ingress. In addition the shell that supports the child can be rotated outwards for easy access.
Figure 12:
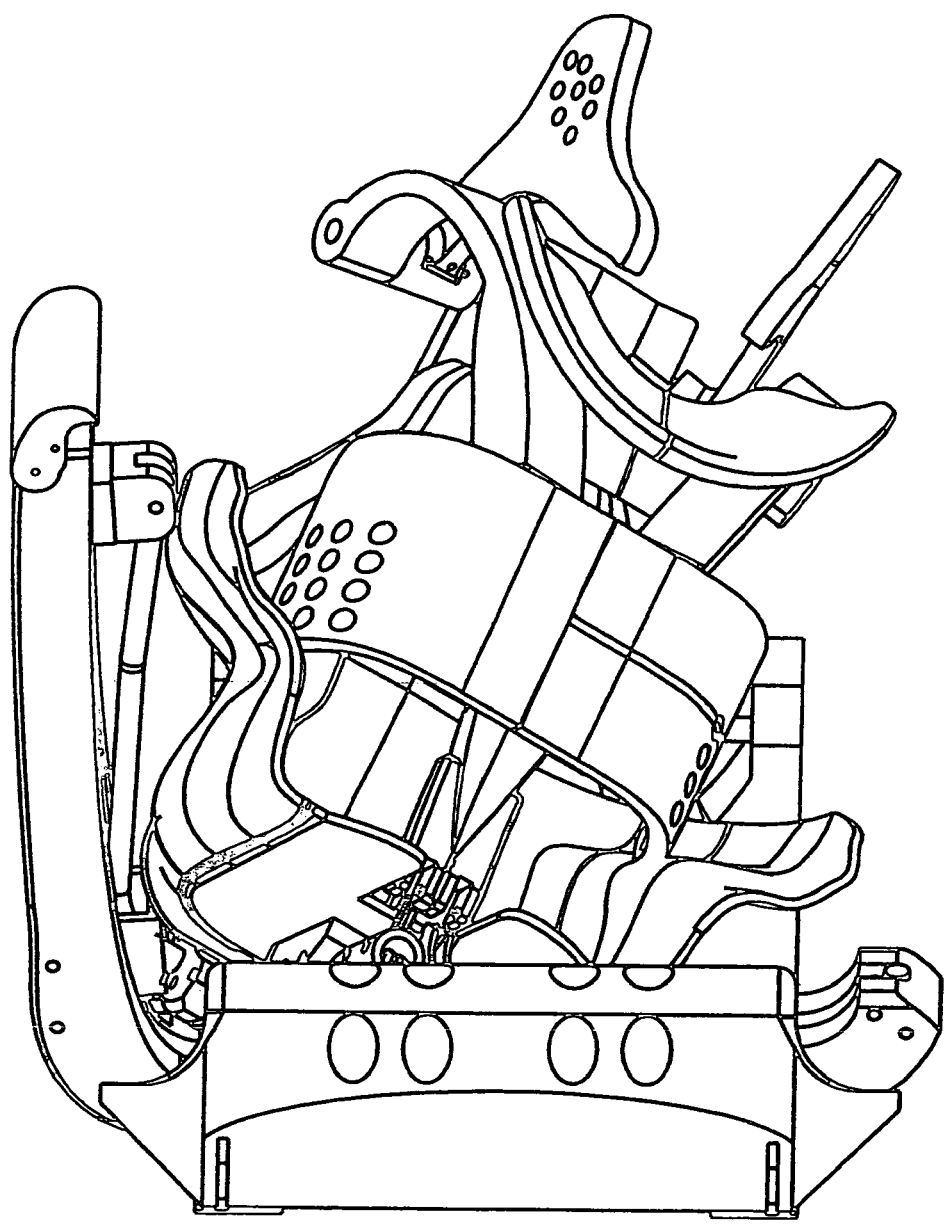
FIG. 12 shows the same front facing CISM at a time it is under lateral acceleration in the vehicle.
Figure 13:
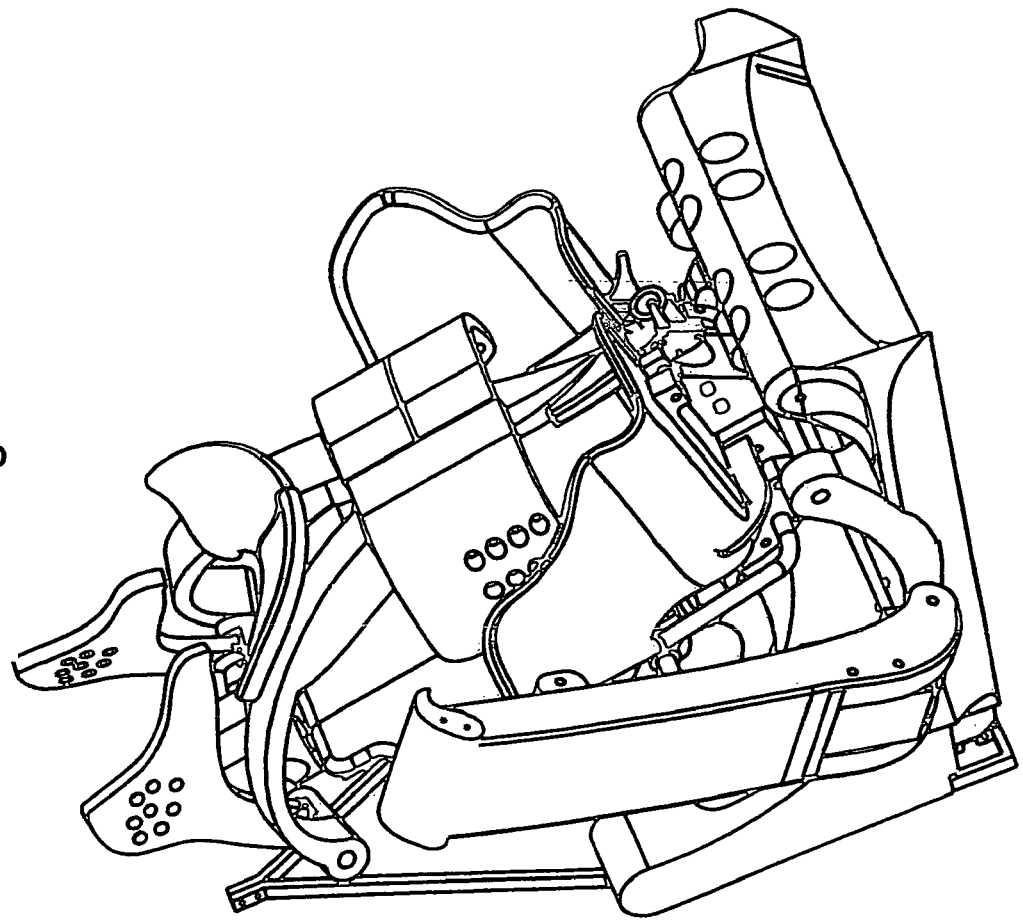
FIG. 13 illustrates the same front facing CISM in the normal operating position with no lateral accelerations.

Another alternative embodiment for occupant support is illustrated in FIGS. 3-10. This embodiment has cylindrical slides for the safety beam lower element 102 and the safety beam upper element 107, with the safety beam upper element driven to the access/loading position FIG. 10E22 with a worm drive inside the safety beam lower element 102, the drive nut or ball screw for the worm drive is attached to the safety beam upper element 107 through a slot C116 in the safety beam lower element 102, as may be seen from the illustrations a lateral impact loading on the protector shield 106 side will be supported by the safety beam lower 102 and upper 107 elements that are braced to the central element 101. However the inertial loading under lateral impact will move the secondary slides (without impact decouplers) 111 relative to the safety beam upper elements 107 against the spring damper shock absorbers placed between 107 and 111 (not shown) thereby reducing the peak acceleration sustained by the occupant. Moreover, when there is a controlled crush of the vehicle the occupant can move as shown from the normal operating position of FIG. 7 to the initially loaded position against the shock absorbers that may have differential parameters to ensure rotation of the occupant away from the impact (towards the acceleration direction) as shown in FIG. 8, and afterwards following the damping of the acceleration pulse move towards the center of the vehicle and away from the crush as shown in FIG. 9 and FIG. 10. These illustrations do not show the seat or passenger support mechanism but only a set of fore/aft adjustment slide mounts for the seats. This embodiment has near vertical pivots C112 and front C114 and rear C113 seat frame supports that are slidably interconnected C115 to allow a variable distance between the sliding Secondary slides 111 with differential displacements under load or during egress and ingress when the impact decouplers and shock absorbers are disengaged allowing the rotation of the seat frame to further ease access for the occupant. A further refinement of this embodiment (not shown 0 is analogous to the CISM of 1,2 where the occupant support has a degree of rotation about an axis in a vertical plane through the direction of motion of the vehicle (analogous to 233 in the CISM of FIGS. 1,2) thereby tilting the occupant support to reduce displacement of the head and thorax while using the impact energy to rotate the passenger support mechanism to increase the area of support. If the Fore aft movement of the passenger support mechanism is not obstructed, the Safety beam lower elements 102, upper elements 107 may be positioned on the rear of the Passenger support mechanism and below it as in the CISMs of FIGS. 1,2. The CISM version of this embodiment may have ISOFIX latches attached to the ends of the safety beam lower element 102 and the Safety beam upper element 107 may be coupled to the secondary slide 111 (or even be the same element in some embodiments). The embodiment of the CISM may not be attached to the central body member 101 or to the protector shields 106.

Additional Embodiments

Yet another embodiment utilizes a viscous fluid filled anatomical micro air cushion with a vent to a secondary chamber and internal constrictions to limit the speed of motion of the fluid within the chamber, thereby taking the shape of the anatomical element such as the back of the head or the thorax, while under gentle pressure, but providing high levels of resistance under sudden compression as in a collision.

Yet another embodiment has a curvilinear sliding surface attached to the CISM, with sets of rollers that engage the sliding surface such that at least some of the sets of rollers are on both sides of the sliding surface thereby transferring pull and push reactive forces from the CISM to the roller mounts. Moreover the sets of rollers may be mounted to a frame that allows controlled lateral movement of the rollers and a degree or rotational motion about an axis parallel to the axis of the rotators such that the rotational motion and the translation motion rotate the CISM to enable the occupant to face away from the impact (towards the direction of acceleration).

ADDITIONAL ASPECTS OF THE INVENTION

A support mechanism for an occupant in a vehicle wherein said support is adapted to reorient under lateral accelerations of the vehicle.

A support for an occupant in a vehicle as in noted above, wherein said support is a multi-part support adapted to allow differential motion of support elements supporting anatomical elements of the occupant under transient acceleration conditions, to utilize the natural flexibility of the occupant anatomy in a confined space in a vehicle, to reorient and relocate anatomical elements of the occupant to lower at least one of peak accelerations, intrusion into the occupant space by vehicle elements due to impact and local loading on the occupant and resulting injury.

A support for an occupant in a vehicle as noted above, wherein said support is a multi-part support adapted to allow differential motion of support elements supporting anatomical elements of the occupant under transient acceleration conditions in a confined space in a vehicle, to utilize the inertial loading of said transient acceleration of a first anatomical element to reorient a support element to protect a second anatomical element.

A support for an occupant in a vehicle as noted above, wherein said support is a multi-part support wherein said multi-part support comprise at least one of a head support, a shoulder support and a torso support.

A support for an occupant in a vehicle as in noted above, wherein said transient acceleration is due to a lateral impact on said vehicle.

A multi-part support noted above wherein the first anatomical element is the torso and the second anatomical element is the head.

The multi-part support noted above wherein the head is supported by a head assembly and the torso is supported by a torso assembly and where in the head assembly is adapted to one or both of rotate about a predefined axis relative to the torso assembly under transient accelerations of the vehicle, and bend laterally along its axis relative to the torso assembly under transient accelerations, thereby reducing the peak acceleration of one or both of the head and torso.

A support for an occupant in a vehicle as noted above, wherein the occupant is a child, comprising one of a front facing or a rear facing detachable support shell in supporting the child.

A support for an occupant in a vehicle as in noted above, wherein said occupant is a child, and wherein said support comprises a base rigidly attached to the vehicle, adapted to support one or both of:

a cradle that is adapted to reorient the child under transient acceleration conditions, wherein said cradle supports a support shell in direct contact with the child, or a booster seat for older children.

An occupant support mechanism for a child as noted above, on a car seat with a back and a bottom, with at least two latch attachment point at the base of the seat back, wherein said base comprises a wishbone that connects a harness attachment point to the at least two latches, and is rigidly attached to the base along its length, thereby providing a rigid support at three or more points for the base.

An occupant support mechanism as noted above, wherein said base is rigidly supported at its rear end and further comprises a linear member adapted to resist an applied toque along its axis, rigidly attached at one end to the rear of the base and to the front end of the base, thereby reducing the distortion of the base resulting from lateral loadings on base at point ahead of the rear of the base, resulting from transient lateral accelerations.

A support mechanism for an occupant in a vehicle, wherein said support mechanism is for a child and comprises a shell with wheels and a handle, adapted to transport said shell when detached from said support mechanism.

An occupant support mechanism as noted above wherein one or both of the wheels and handle of the support shell are retractable, thereby reducing the required space in the vehicle when attached to the support mechanism.

A support for an occupant in a vehicle as noted above, comprising a support shell for the occupant that is adapted to be reoriented to face substantially outside the vehicle to facilitate egress and ingress.

A support mechanism for an occupant in a vehicle as noted above, wherein said support comprises a child support shell and a harness adapted to restrain the occupant substantially within the support shell, wherein said harness comprises a left half and a right half, each of which are pivotally attached to axes on the support mechanism, substantially behind the back of the occupant and each seperably attached at one or both of a point on the support mechanism between the legs of the occupant and a point on the support mechanism beside the occupant, such that on release of the seperably attached harness, each of said harness halves, may be moved subject to their pivotal constraints away from the occupant as each of them rise, thereby easing egress and ingress of the occupant from the support mechanism.

An occupant support mechanism for a child in a vehicle as noted above, wherein the separable attachment points may be moved and locked in positions towards and away from the occupant to facilitate securing of children with different waist and chest measurements.

An occupant support mechanism as noted above, wherein one or both of: the height of the axes for support for the left and right half harnesses; and the length of each of the left and right half harness, are adjustable to accommodate taller and shorter children.

An occupant support mechanism as noted above, wherein each of the left half and right half harness have a belly pad that provides support to the torso of the occupant in a frontal or oblique impact.

An occupant support mechanism as noted above wherein each of the left and right half harness has a aircushion adjoining the torso of the occupant that supports the occupant in the event of a frontal or oblique impact on the vehicle.

An occupant support mechanism as noted above, wherein both of said left half and right half of the harness have a support pad for the head in the event of a front impact thereby reducing the neck tensile loadings during such impact.

A support mechanism for an occupant in a vehicle as noted above, wherein said support is for a child and is adapted to reorient a supported child under transient acceleration conditions, wherein the head is supported by a pair of pillow pads on either side of the head in the event of a lateral transient acceleration, wherein the reorientation of the support mechanism concurrently reorients the pillow pad with reaction force to the head to be substantially orthogonal to the direction of the lateral reaction force.

A support for an occupant in a vehicle as noted above, wherein said support is for a child and is adapted to reorient a supported child under transient acceleration conditions, wherein the head is supported by a pair of pillow pads on either side of the head wherein the position of the pillow pad in the absence of lateral accelerations lies in an angled position slightly below the head to one or more of: allow the child to rest its head on said pillow pad; provides a less obstructed field of view than wings; reduces obstruction to hearing.

A support for an occupant in a vehicle as noted above, wherein said support is adapted to reorient a supported occupant under transient acceleration conditions, wherein said reorientation is in discrete steps with multiple stages with increasing accelerations enabled with multistage shock absorption devices.

An occupant support mechanism in a vehicle, comprising a support shell which comprises a substantially rigid structural shell with perforations, within which is interposed adjoining it, a flexible membrane with perforations staggered to the perforations of the structural shell and adjoining it a foam layer that is adapted to absorb air on expansion and release air on compression, within which is a gas permeable membrane adapted to be adjoining the occupant, such that during transient lateral accelerations of the vehicle in a first direction the inertial mass of the occupant compresses the foam thereby forcing air to the occupant side as the membrane with perforation s adjoining the structural shell with perforations will as a result for the force of compression and as a result of the staggered perforations, provide a seal against the transfer of air through the structural shell and wherein during transient lateral accelerations in a second direction the inertial mass shifts away from the foam and permeable membrane thereby allowing the foam to suck air from both sides, wherein the low pressure created bet to the perforated membrane separates it from the perforated structural shell thereby allowing the staggered perforations to permit the infusion of air into the foam from the outer surface of the structural shell, thereby creating a mechanism for fresh air to enter the support shell for enhancing the comfort of the occupant.

CONCLUSIONS, RAMIFICATIONS & SCOPE

Thus it will become apparent that the present invention presented, provides a new paradigm for implementing key safety comfort and convenience features and providing utility in accessing vehicles. While the above description provides many specificities, these should not be construed as limitations on the scope of the present invention, but rather as an exemplification of the preferred, an additional and an alternative embodiment thereof. Many other variations are possible.

The invention claimed is:

1. A vehicle child seat comprising a seat shell including a bottom and a back, said seat shell attached to a base assembly with a cavity there-between by:
   a plurality of sliders pivotally attached to the seat shell, wherein each slider is slidably attached to the base assembly with a slide, and wherein said slides are parallel to one another;
   a pivot support attached to the seat shell and attached to the base assembly;
   a shock absorbing element engaging the seat shell and attached to the base assembly,
wherein during impact on a vehicle in which said vehicle child seat is positioned, the base assembly is configured to accelerate with the vehicle relative to the seat shell, and said seat shell is configured to reorient with respect to said base assembly while advancing into the cavity, said reorientation enabled by:
   the plurality of sliders pivoting about a common axis that moves along the parallel slides as said sliders slide along their respective parallel slides and pivot about their pivotal attachments to the seat shell;
   the pivot support restraining motion of said seat shell in a direction opposite the acceleration; and
   deflection of the shock absorbing element,
wherein said reorientation of the seat shell increases a support provided to said child by a surface of said seat shell in a direction against the acceleration.

2. The vehicle child seat as in claim 1, wherein said pivot support is fixedly attached to the seat shell and slides perpendicular to the acceleration on the base assembly.

3. The vehicle child seat as in claim 1, wherein the pivot support is attached to the seat shell with a flexible member enabled to limit motion of the seat shell in a predetermined controlled manner.

4. The vehicle child seat as in claim 1, wherein the pivot support is a flexible member to augment shock absorption.

5. The vehicle child seat as in claim 1, wherein the shock absorbing element is a multi-stage shock absorber with a plurality of stiffness characteristics depending on a deflection.

6. The vehicle child seat as in claim 5, wherein the multi-stage shock absorber has pre-determined controlled deflection force parameters to reorient the seat shell adequately to a protected position with a smaller force such that subsequent large forces during impact are resisted with additional stages of the shock absorber.

7. The vehicle child seat as in claim 1, wherein said seat shell is detachable from a cradle that comprises said sliders, pivot support and the shock absorbing element.

8. The vehicle child seat as in claim 7, wherein one of a plurality of seat shells for different sizes may be attached to the cradle.

9. The vehicle child seat as in claim 8, wherein at least one of said plurality of seat shells is configured to support a child in a rear facing mode.

10. The vehicle child seat as in claim 9, wherein said seat shell configured to support the child in the rear facing mode, comprises retractable wheels, enabled to extend for wheeling the seat shell when a retractable handle is extended.

11. A vehicle child seat comprising a seat shell including a bottom and a back, said seat shell attached to a base assembly by:
   a plurality of spaced apart first pivots with a common axis which is enabled to move along a predetermined path with respect to the base assembly;
   a second pivot support attached to the shell and attached to the base assembly;
   a shock absorbing element engaging the seat shell and attached to the base assembly,
wherein upon impact on a vehicle, in which said vehicle child seat is positioned, the base assembly is configured to accelerate with the vehicle relative to the seat shell, and said seat shell is configured to reorient with respect to said base assembly while lowering the bottom of the seat shell, said reorientation enabled by:
   the plurality of first pivots with a common axis moving along its predetermined path while pivoting the seat shell;
   the second pivot support restraining motion of said seat shell in a direction opposite the acceleration; and
   deflection of the shock absorbing element,
wherein said reorientation of the seat shell increases a support provided to said child by a surface of said seat shell in a direction against the acceleration.

12. The vehicle child seat as in claim 11, wherein said second pivot support is fixedly attached to the seat shell and slides perpendicular to the acceleration on the seat base assembly.

13. The vehicle child seat as in claim 11, wherein the second pivot support is attached to the seat shell with a flexible member enabled to limit motion of the seat shell in a predetermined controlled manner.

14. The vehicle child seat as in claim 11, wherein the second pivot support is a flexible member to augment shock absorption.

15. The vehicle child seat as in claim 11, wherein said shock absorbing element is a multi-stage shock absorber with a plurality of stiffness characteristics depending on a deflection.

16. The vehicle child seat as in claim 15, wherein the multi-stage shock absorber has pre-determined controlled deflection force parameters to reorient the seat shell adequately to a protected position with a smaller force such that subsequent large forces during impact are resisted with additional stages of the shock absorber.

17. The vehicle child seat as in claim 11, wherein said seat shell is detachable from a cradle that comprises said first pivots and second pivot support and the shock absorbing element.

18. The vehicle child seat as in claim 17, wherein one of a plurality of seat shells for different sizes may be attached to the cradle.

19. The vehicle child seat as in claim 18, wherein at least one of said plurality of seat shells is configured to support a child in a rear facing mode.

20. The vehicle child seat as in claim 19, wherein said seat shell configured to support the child in the rear facing mode, comprises retractable wheels, enabled to extend for wheeling the shell when a retractable handle is extended.

* * * * *